(12) United States Patent
Okano et al.

(10) Patent No.: US 11,805,307 B2
(45) Date of Patent: Oct. 31, 2023

(54) ELECTRONIC APPARATUS CAPABLE OF WIRELESSLY COMMUNICATING WITH EXTERNAL DEVICE MOUNTED THEREON, AND EXTERNAL DEVICE

(71) Applicant: CANON KABUSHIKI KAISHA, Tokyo (JP)

(72) Inventors: Yoshinobu Okano, Saitama (JP); Keita Hirayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 17/667,142

(22) Filed: Feb. 8, 2022

(65) Prior Publication Data
US 2022/0263983 A1  Aug. 18, 2022

(30) Foreign Application Priority Data
Feb. 16, 2021 (JP) .................................. 2021-022569

(51) Int. Cl.
*H04N 23/54* (2023.01)
*H01Q 1/22* (2006.01)
(Continued)

(52) U.S. Cl.
CPC ........... *H04N 23/54* (2023.01); *G03B 17/566* (2013.01); *H01Q 1/22* (2013.01); *H04N 5/76* (2013.01);
(Continued)

(58) Field of Classification Search
CPC ........ H04N 23/54; H04N 23/50; H04N 23/00; H04N 25/71; H04N 25/76; H04N 5/76;
(Continued)

(56) References Cited

U.S. PATENT DOCUMENTS 6,104,883 A * 8/2000 Pagano .................... G03B 7/24
396/211
10,951,796 B2 * 3/2021 Ueda ...................... H04N 23/51
(Continued)

FOREIGN PATENT DOCUMENTS

| EP | 1041429 A | 10/2000 |
|----|-----------|---------|
| JP | 2016-086211 A | 5/2016 |
| JP | 2018-084681 A | 5/2018 |

OTHER PUBLICATIONS

European Search Report dated Jul. 19, 2022, that issued in the corresponding European Patent Application No. 22153100.7.

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

An electronic apparatus which is capable of communicating with an external device mounted thereon, and the external device. An external engagement unit of the external device is capable of being mounted into an apparatus engagement unit of the electronic apparatus. A plurality of apparatus wireless communicators is located in the apparatus engagement unit so as to face respective ones of a plurality of external wireless communicators located in the external engagement unit mounted into the apparatus engagement unit. The plurality of apparatus wireless communicators is arranged in the apparatus engagement unit such that radiation characteristics of all of the plurality of apparatus wireless communicators are at least not parallel. The plurality of external wireless communicators is arranged in the external engagement unit such that radiation characteristics of all of the plurality of external wireless communicators are at least not parallel.

13 Claims, 14 Drawing Sheets

(51) Int. Cl.
*G03B 17/56* (2021.01)
*H04N 5/76* (2006.01)
*H04N 23/50* (2023.01)
*H04W 4/30* (2018.01)
*H04N 25/71* (2023.01)
*H04N 25/76* (2023.01)
*H04N 23/00* (2023.01)

(52) U.S. Cl.
CPC ............. *H04N 23/00* (2023.01); *H04N 23/50* (2023.01); *H04N 25/71* (2023.01); *H04N 25/76* (2023.01); *H04W 4/30* (2018.02); *G03B 2206/00* (2013.01); *G03B 2206/002* (2013.01)

(58) Field of Classification Search
CPC .. G03B 17/56; G03B 17/566; G03B 2206/00; G03B 2206/002; G03B 2217/002; H04W 4/30; H03J 2200/06; G08B 13/2474; H01Q 1/22; H01Q 1/2283; H01Q 1/2291; H01Q 3/2629; H01Q 3/2635; H01Q 3/2641; H01Q 1/088; H01Q 1/325; H01Q 3/01; H01Q 3/02; H01Q 7/005; H01Q 9/18; H01Q 21/065; H01Q 21/225

See application file for complete search history.

(56) References Cited

U.S. PATENT DOCUMENTS

| | | | |
|---|---|---|---|
| 2002/0176711 A1 | 11/2002 | Shizukuishi | |
| 2008/0298793 A1* | 12/2008 | Clark | G03B 17/566 396/57 |
| 2012/0194688 A1* | 8/2012 | Li | G03B 17/18 348/E5.043 |
| 2014/0009671 A1* | 1/2014 | Ozone | G03B 17/566 348/370 |
| 2016/0124291 A1* | 5/2016 | Qingyuan | G03B 17/566 396/439 |
| 2017/0171451 A1* | 6/2017 | Iwasa | H04N 23/51 |
| 2020/0225488 A1* | 7/2020 | Goupil | G02B 27/0172 |
| 2021/0405513 A1* | 12/2021 | Ishii | G03B 15/05 |
| 2022/0163875 A1* | 5/2022 | Saito | G03B 15/05 |

* cited by examiner

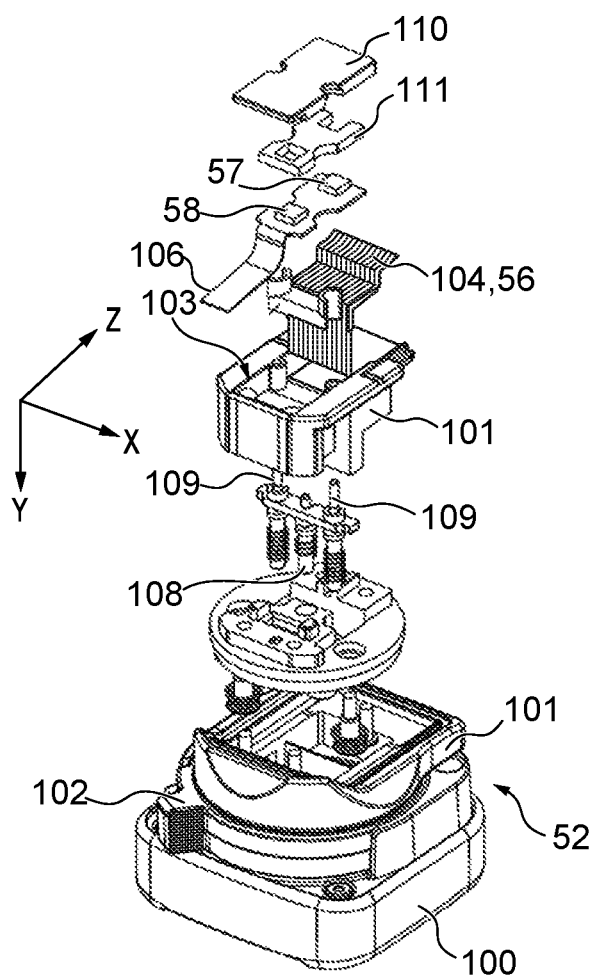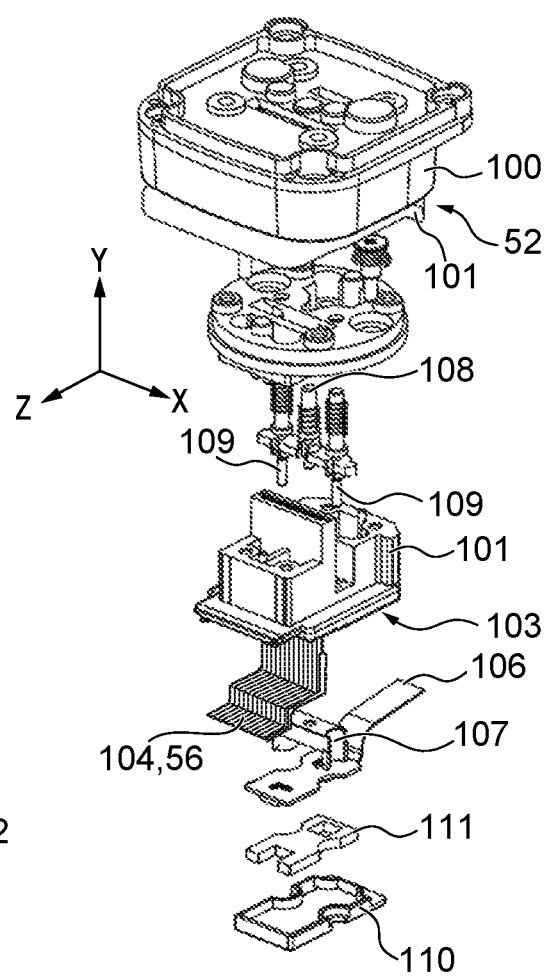
FIG. 6A
FIG. 6B

ELECTRONIC APPARATUS CAPABLE OF WIRELESSLY COMMUNICATING WITH EXTERNAL DEVICE MOUNTED THEREON, AND EXTERNAL DEVICE

BACKGROUND OF THE INVENTION

Field of the Invention

The present invention relates to electronic apparatuses and external devices.

Description of the Related Art

Examples of electronic apparatus include digital cameras on which external devices like camera accessories are mounted and used.

Image pickup apparatuses such as digital cameras are configured such that accessories such as a flash and floodlight are mounted thereon (see Japanese Laid-Open Patent Publication (Kokai) No. 2018-084681 and Japanese Laid-Open Patent Publication (Kokai) No. 2016-086211).

There is a possibility that electronic apparatuses such as image pickup apparatuses are configured to generate a large amount of data in the future. In such electronic apparatuses, their storage space may be insufficient to store data, and hence a shortage of data storage capacity may occur. To solve the shortage, it is conceivable that electronic apparatuses are configured to be connected to external devices capable of storing data for the electronic apparatuses and that the electronic apparatuses and the external devices are required to transmit a large amount of data at high speed between them.

For another purpose, image pickup apparatuses such as digital cameras have conventionally employed an apparatus engagement portion having an accessory shoe mechanism so as to connect to an accessory device. It is conceivable that a component like an accessory shoe mechanism is used for electronic apparatuses so that the electronic apparatuses can be connected to external devices that store data for the electronic apparatuses.

However, such an apparatus engagement portion having an accessory shoe mechanism, provided in an image pickup apparatus, already has a flat connector on which a plurality of pin electrode members and/or a plurality of electrode terminals are flatly arrayed so that setting data and others can be transmitted between the image pickup apparatus and an accessory device. It is difficult for the apparatus engagement portion having the accessory shoe mechanism to additionally have a physically connected connector and an electrode member. For this reason, in image pickup apparatuses disclosed in Japanese Laid-Open Patent Publication (Kokai) No. 2018-084681 and Japanese Laid-Open Patent Publication (Kokai) No. 2016-086211, in addition to such an apparatus engagement portion having an accessory shoe mechanism, an apparatus wireless communicator is provided, for example, around the apparatus engagement portion having the accessory shoe mechanism. However, having such an apparatus wireless communicator in addition to the apparatus engagement portion having the accessory shoe mechanism will increase the distance from the wireless communicator for the electronic apparatus like an image pickup apparatus to a wireless communicator for an external device like an accessory device. If the distance over which radio waves propagate increases, the need to raise output in warless communications will arise. Particularly when a large amount of data is transmitted at high speed, the frequency of radio waves is high, and hence it is necessary to further increase output.

As described above, there is a demand that electronic apparatuses such as image pickup apparatuses are configured such that an external device is mounted thereon so as to transmit a large amount of data at high speed between the external device and themselves.

SUMMARY OF THE INVENTION

According to an aspect of the invention, an electronic apparatus capable of communicating with an external device mounted thereon, includes an apparatus engagement unit into which an external engagement unit of the external device is to be mounted, and a plurality of apparatus wireless communicators. The plurality of apparatus wireless communicators is located in the apparatus engagement unit so as to face a plurality of external wireless communicators located in the external engagement unit mounted into the apparatus engagement unit, respectively. The plurality of apparatus wireless communicators is arranged in the apparatus engagement unit such that radiation characteristics of all of the plurality of apparatus wireless communicators are at least not parallel.

According to an aspect of the invention, an electronic apparatus capable of communicating with an external device mounted thereon, includes an apparatus engagement unit into which the external device is to be mounted, and a wireless communicator. The wireless communicator is located in the apparatus engagement unit and capable of communicating with the external device mounted into the apparatus engagement unit. The apparatus engagement unit includes a metallic shoe plate that includes a slide opening and is engageable with the external device slidably mounted into the apparatus engagement unit through the slide opening, while surrounding the external device in three directions other than a sliding direction in which the external device slides. The wireless communicator has a radiation characteristic toward the slide opening.

According to an aspect of the invention, an external device capable of communicating with an electronic apparatus while being mourned on the electronic apparatus, includes an external engagement unit capable of being slidably mounted into an apparatus engagement unit of the electronic apparatus, and a plurality of external wireless communicators. The plurality of external wireless communicators is located in the external engagement unit so as to face a plurality of apparatus wireless communicators located in the apparatus engagement unit of the electronic apparatus, respectively. The plurality of external wireless communicators is arranged in the external engagement unit such that radiation characteristics of all of the plurality of external wireless communicators are at least not parallel.

According to an aspect of the invention, an external device capable of communicating with an electronic apparatus while being mounted on the electronic apparatus, includes an external engagement unit capable of being slidably mounted onto the electronic apparatus, and a wireless communicator. The wireless communicator is located in the external engagement unit and capable of communicating with the electronic apparatus. The wireless communicator has a radiation characteristic in a direction opposite to a direction in which the external engagement unit is slidably mounted onto the electronic apparatus.

According to the present invention, an external device is mounted on an electronic apparatus such that a large amount of data can be transmitted at high speed between the external device and the electronic apparatus.

Further features of the present invention will become apparent from the following description of exemplary embodiments with reference to the attached drawings.

BRIEF DESCRIPTION OF THE DRAWINGS

FIGS. 6A and 6B are exploded perspective views of the external recording device in FIG. 4.

DESCRIPTION OF THE EMBODIMENTS

Embodiments of the present invention will now be described in detail with reference to the drawings. Configurations of the embodiments described below, however, are examples for illustrative purposes only, and the scope of claims is not limited to the configurations of the embodiments described below.

Figure 1A:
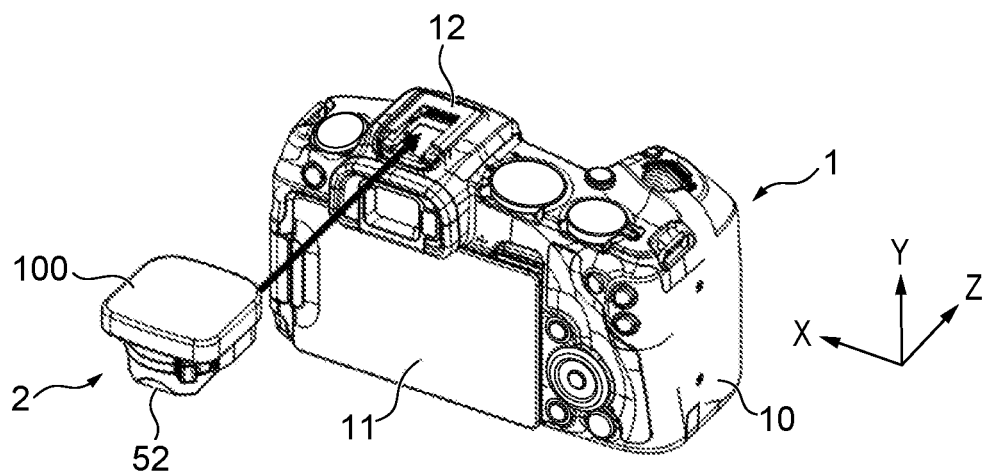
FIGS. 1A and 1B are perspective views of a digital camera, which is an electronic apparatus, and an external recording device, which is an external device, according to an embodiment of the present invention.
Figure 1B:
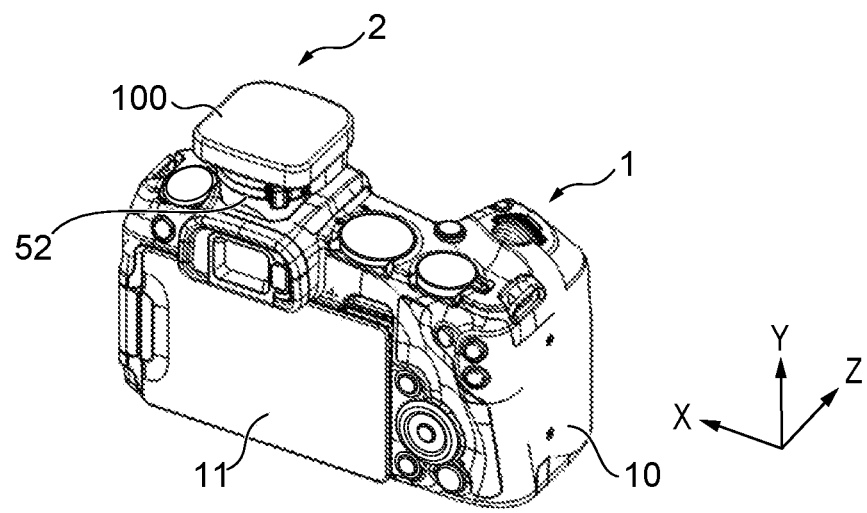

FIGS. 1A and 1B are perspective views of a digital camera 1, which is an electronic apparatus, and an external recording device 2, which is an external device, according to the embodiment of the present invention.

FIG. 1A is a perspective view of the digital camera 1 and the external recording device 2 being separated from each other.

FIG. 1B is a perspective view of the external recording device 2 being slidably mounted onto the digital camera 1.

The figures illustrate a Z axis in the front-back direction of the digital camera 1, which is the direction of the optical axis of the digital camera 1, a Y axis in the vertical direction of the digital camera 1, and an X axis in the horizontal direction of the digital camera 1. In figures referred to later, these three axes are illustrated as needed for cross-referencing of the figures.

The digital camera 1 has a camera body 10. A monitor 11 is placed on the rear surface of the camera body 10. An apparatus engagement unit (or apparatus-side engagement unit) 12 having an accessory shoe mechanism, is located on the upper surface of the camera body 10.

The apparatus engagement unit 12 of the digital camera 1 is configured such that an external recording device 2 is slidably mounted into the apparatus engagement unit 12.

The apparatus engagement unit 12 of the digital camera 1 is further configured such that any of accessory devices fir the digital camera 1, such as a flash device and a floodlight device, as well as the external recording device 2 is slidably mounted into the apparatus engagement unit 12. The apparatus engagement unit 12 conventionally includes a flat connector on which a plurality of pin electrode members and/or a plurality of electrode terminals are flatly arrayed so that setting data and others can be sent to and received from an accessory device such as a flash device. Therefore, it is not easy to additionally provide the apparatus engagement unit 12 with physical connectors and electrode members, which are for sending and receiving a large amount of data at high speed, for the external recording device 2.

Figure 2:
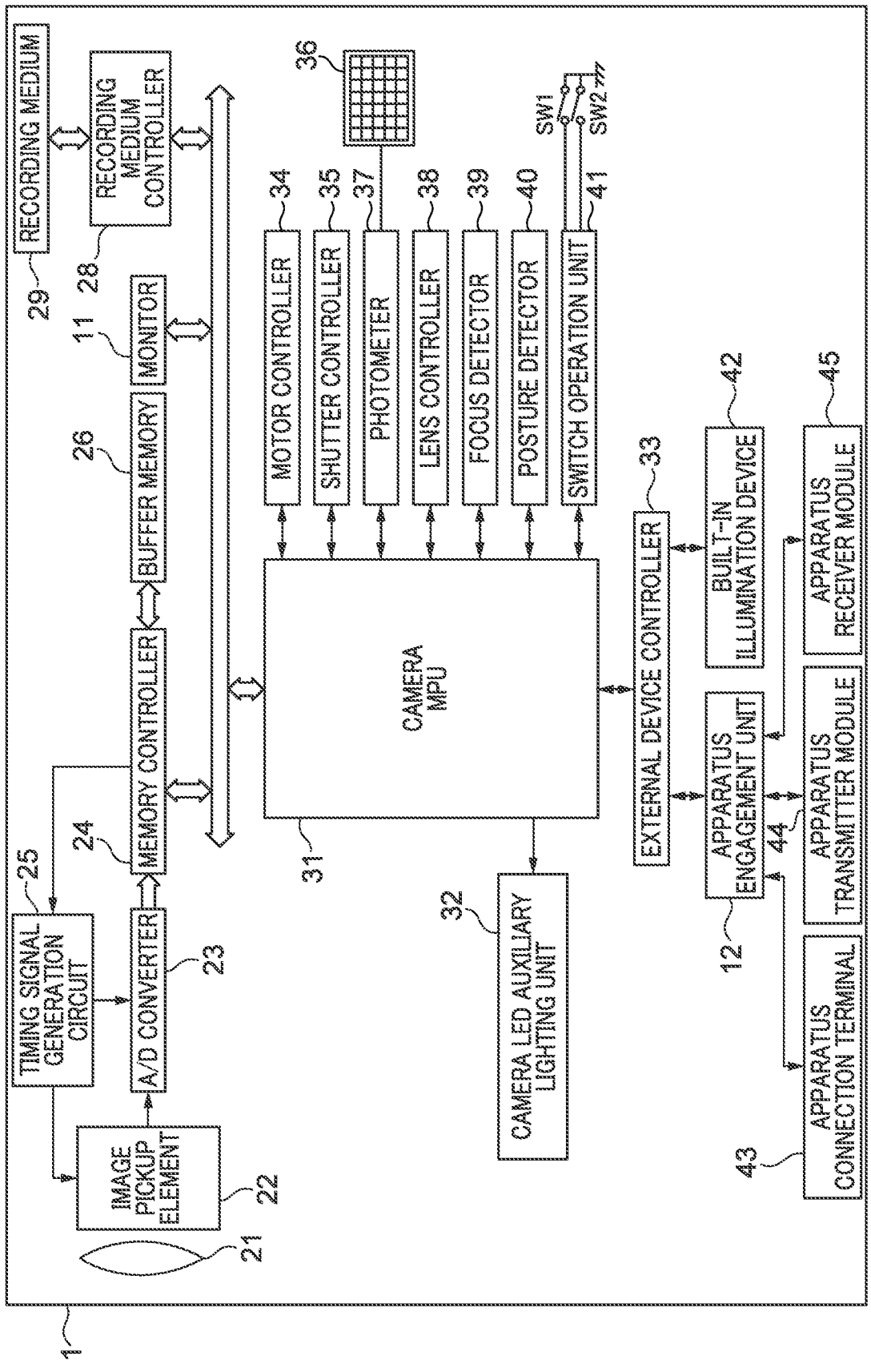
FIG. 2 is a schematic diagram useful in explaining an arrangement of the digital camera in FIGS. 1A and 1B.

FIG. 2 is a schematic diagram useful in explaining an arrangement of the digital camera 1 in FIGS. 1A and 1B.

The digital camera 1 in FIG. 2 includes an image pickup optical system 21, an image pickup element 22, an A/D converter 23, a memory controller 24, a timing signal generation circuit 25, a buffer memory 26, a monitor 11, a recording medium controller 28, and a recording medium 29.

The image pickup optical system 21 includes a plurality of lenses such as a zoom lens and a focus lens, a diaphragm, and a shutter. The image pickup optical system 21 forms reflected light from a subject into an image on the image pickup element 22.

The image pickup element 22 may be an image sensor like a CCD or CMOS. The image pickup element 22 converts an optical image, which is reflected light from a subject, into an electric signal.

The A/D converter 23 converts analog electric signals (analog image data) read from the image pickup element 22 into digital electric signals (digital image data).

The buffer memory 26 temporarily records digital image data output from the A/D converter 23. The buffer memory 26 may temporarily record image data of an image to be displayed on the monitor 11.

The memory controller 24 manages operations of the buffer memory 26. The memory controller 24 causes the buffer memory 26 to perform a refresh operation and others.

The timing signal generation circuit 25 outputs timing signals for operation to the image pickup element 22 and the A/D converter 23 under the control of the memory controller 24.

The monitor 11 can be, for example, a liquid crystal panel or an organic EL panel. The monitor 11 displays, for example, image data accumulated in the buffer memory 26.

The recording medium 29 can be, for example, a memory card that is removably attached to the digital camera 1. Alternatively, the recording medium 29 can be a hard disk incorporated in the digital camera 1.

The recording medium controller 28 controls writing and reading of data to and from the recording medium 29.

As described above, the digital camera 1 includes the recording medium 29 on which data of shot still images and moving images (video) are recorded. A medium with a large storage capacity is basically used as the recording medium 29. In recent years, however, increases in the number of pixels of an image pickup element and frame rate have been demanded for digital cameras, and it may be feared that the capacity of a storage area of a recording medium provided in a digital camera itself will be insufficient.

For this reason, digital cameras are required to be configured such that an external recording device capable of storing data taken by the digital camera is connectable to the digital camera. In this case, it is necessary to transmit a large amount of data for high-resolution still images and/or moving images between the digital camera and the external recording device at high speed. It is difficult for conventional digital cameras to send and receive such a large amount of data at high speed, because of the standard of a flat connector with a flat array of a plurality of pin electrode members and/or a plurality of electrode terminals, which is employed in conventional digital camera accessories.

The digital camera 1 in FIG. 2 includes a camera MPU 31 that controls the overall operation of the digital camera 1. The camera. MPU 31 can be, for example, a microcontroller.

The memory controller 24, the monitor 11, the recording medium controller 28, a camera LED auxiliary lighting unit 32, and an external device controller 33 are connected to the camera MPU 31. A motor controller 34, a shutter controller 35, a photometer 37, a lens controller 38, and a focus detector 39, a posture detector 40, and a switch operation unit 41 are also connected to the camera MPU 31.

The motor controller 34 controls a motor, which is not illustrated, according to signals for exposure operation, given by the camera MPU 31. The motor controller 34 flips up and down a mirror, which is not illustrated, provided in the image pickup optical system 21 and charges a shutter.

The shutter controller 35 cuts electric power supplied to the shutter (including a first shutter curtain and a second shutter curtain) provided in the image pickup optical system 21 according to signals for exposure operation, given by the camera MPU 31. This causes the first shutter curtain and the second shutter curtain to run, light falls upon the image pickup element 22, and the exposure operation is performed.

The photometer 37 includes a multi-zone photometric sensor 36. The multi-zone photometric sensor 36 uses an image pickup screen of the image pickup element 22 segmented into multiple zones and outputs luminance signals from of the respective zones. The photometer 37 outputs the luminance signals from the multi-zone photometric sensor 36 to the camera MPU 31. Based on the luminance signals obtained from the photometer 37, the camera MPU 31 computes an AV (aperture value), a TV (shutter speed or time value), an ISO sensitivity (sensitivity of the image pickup element 22), and so forth. The photometer 37 may output, to the camera MPU 31, a luminance signal when a built-in illumination device 42 fires a preliminary flash (pre-flashes) toward a subject. Based on the luminance signal at the time of pre-flashing, the camera MPU 31 may compute the amount of light to be emitted from the built-in illumination device 42 (the amount of light in main flashing) during main exposure (main shooting).

The focus detector 39 uses a well-known phase-difference detection method to detect the amount of defocus with respect to a subject so as to control auto focusing (AF).

The camera LED auxiliary lighting unit 32 irradiates a subject with near-infrared light (LED auxiliary light) with a predetermined pattern, which is used as auxiliary light for focus detection control performed by the focus detector 39.

The lens controller 38 is provided in a lens barrel member, which is not illustrated, of the image pickup optical system 21. The lens controller 38 communicates with the camera MPU 31 through a lens mount contact, which is not illustrated. The lens controller 38 runs a lens driving motor and a lens diaphragm motor, which are not illustrated, of the lens barrel member to control a focus and aperture of the image pickup optical system 21.

The posture detector 40 detects a tilt of the digital camera 1 with respect to a direction of rotation about an imaging optical axis.

The switch operation unit 41 detects operations of a release button, which is not illustrated, with a plurality of switches such as a first switch SW1 and a second switch SW2. When the release button is depressed halfway down so as to, for example, start taking an image, the first switch SW1 is turned on. In response to the turning-on of the first switch SW1, the camera MPU 31 starts an AF process and a photometry process. When the release button is depressed fully down, the second switch SW2 is turned on. In response to the turning-on of the second switch SW2, the camera MPU 31 starts an exposure operation for taking an image.

The apparatus engagement unit 12 and the built-in illumination device 42 are connected to the external device controller 33.

The built-in illumination device 42 fires a preliminary flash (pre-flashes) toward a subject.

The apparatus engagement unit 12 is configured such that an accessory device for the digital camera 1 is removably and slidably mourned into the apparatus engagement unit 12.

In the apparatus engagement unit 12, an apparatus transmitter module (apparatus-side transmitter module) 44 and an apparatus receiver module (apparatus-side receiver module) 45 are located together with an apparatus connection terminal 43. The apparatus connection terminal 43 may include an external flat connector 104 on which a plurality of pin electrode members and/or a plurality of electrode terminals are flatly arrayed.

The apparatus transmitter module 44 and the apparatus receiver module 45 are a plurality of apparatus wireless communicators (apparatus-side wireless communicators) of the digital camera 1.

Upon detecting installation of an accessory device such as the external recording device 2 into the apparatus engagement unit 12, the external device controller 33 starts feeding power to the accessory device via the apparatus engagement unit 12.

Figure 3:
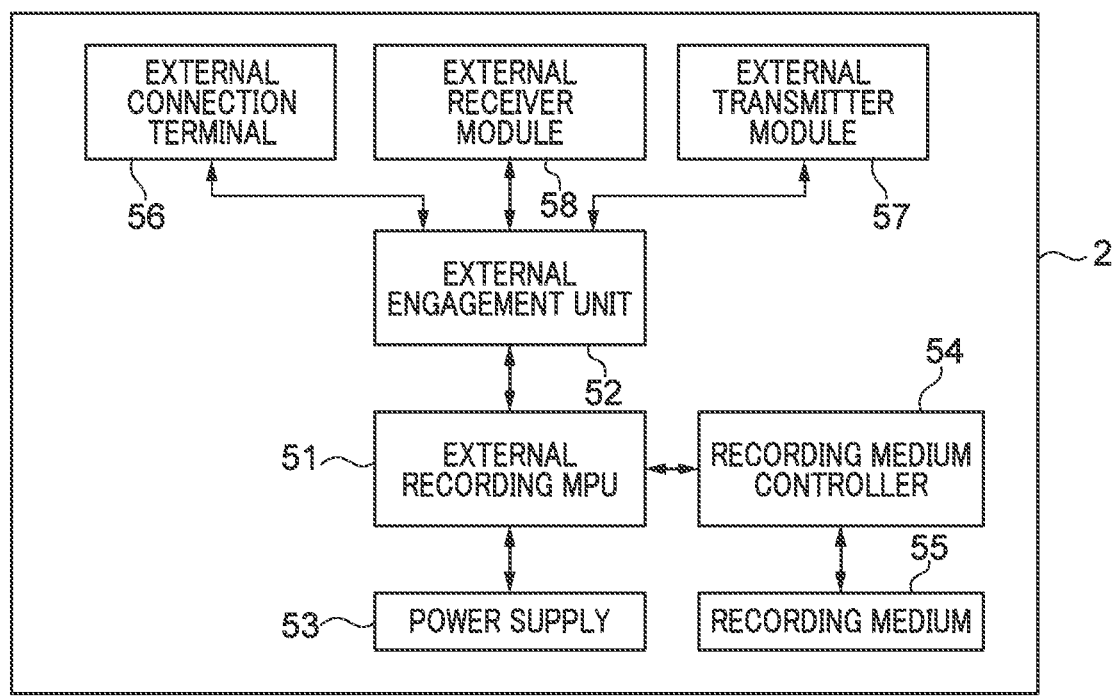
FIG. 3 is a schematic diagram useful in explaining an arrangement of the external recording device in FIGS. 1A and 1B.

FIG. 3 is a schematic diagram useful in explaining an arrangement of the external recording device 2 in FIGS. 1A and 1B.

The external recording device 2 in FIG. 3 includes an external recording MPU 51. An external engagement unit 52, a power supply 53, and a recording medium controller 54 are connected to the external recording MPU 51.

The external recording MPU 51 is mounted on a main board, which is not illustrated, of the external recording device 2. The external recording MPU 51 controls the overall operation of the external recording device 2. The power supply 53 supplies power to components of the external recording device 2. The power supply 53 may be either built in the external recording device 2 or removable from the external recording device 2.

The power supply 53 may be provided in the external engagement unit 52 and supply power, which is fed from the external device controller 33 of the digital camera 1, to components of the external recording device 2 through the apparatus connection terminal 43 of the digital camera 1.

The recording medium controller 54 controls writing and reading of data to and from a recording medium 55 mounted on the external recording device 2. The recording medium controller 54 is capable of storing, for example, data taken by the digital camera 1 on the recording medium 55 that is a storage device.

The recording medium 55 can be, for example, a memory card that is removably attached to the external recording device 2. The memory card can be a semiconductor memory.

The external engagement unit 52 is configured to be slidably engaged with the apparatus engagement unit 12. The digital camera 1 and the external recording device 2 are configure to be mechanically connected together and also electrically connected together in a state in which the external engagement unit 52 and the apparatus engagement unit 12 are engaged together.

In the apparatus engagement unit 12, an external connection terminal 56, an external transmitter module 57, and an external receiver module 58 are located. The engagement between the external engagement unit 52 and the apparatus engagement unit 12 causes the external connection terminal 56 to be physically connected to the apparatus connection terminal 43 of the digital camera 1.

In the apparatus engagement unit 12, the apparatus transmitter module 44 and the apparatus receiver module 45 are located so as to face the external receiver module 58 and the external transmitter module 57 of the digital camera 1, respectively, and in the external engagement unit 52, the external receiver module 58 and the external transmitter module 57 are arranged so as to face the apparatus transmitter module 44 and the apparatus receiver module 45 of the digital camera 1, respectively. Thus, in the area where the external engagement unit 52 and the apparatus engagement unit 12 are engaged together, the external transmitter module 57 of the digital camera 1 lies close to the apparatus receiver module 45 of the digital camera 1, and the external receiver module 58 of the digital camera 1 lies close to the apparatus transmitter module 44 of the digital camera 1.

The camera MPU 31 and the external recording MPU 51 are capable of sending and receiving a large amount of data at high speed with low output and low power consumption using multiple sets of wireless communicators comprised of a wireless communication path formed by the external transmitter module 57 and the apparatus receiver module 45 and a wireless communication path formed by the external receiver module 58 and the apparatus transmitter module 44.

It should be noted that there may be three or more sets of wireless communicators.

Figure 4:
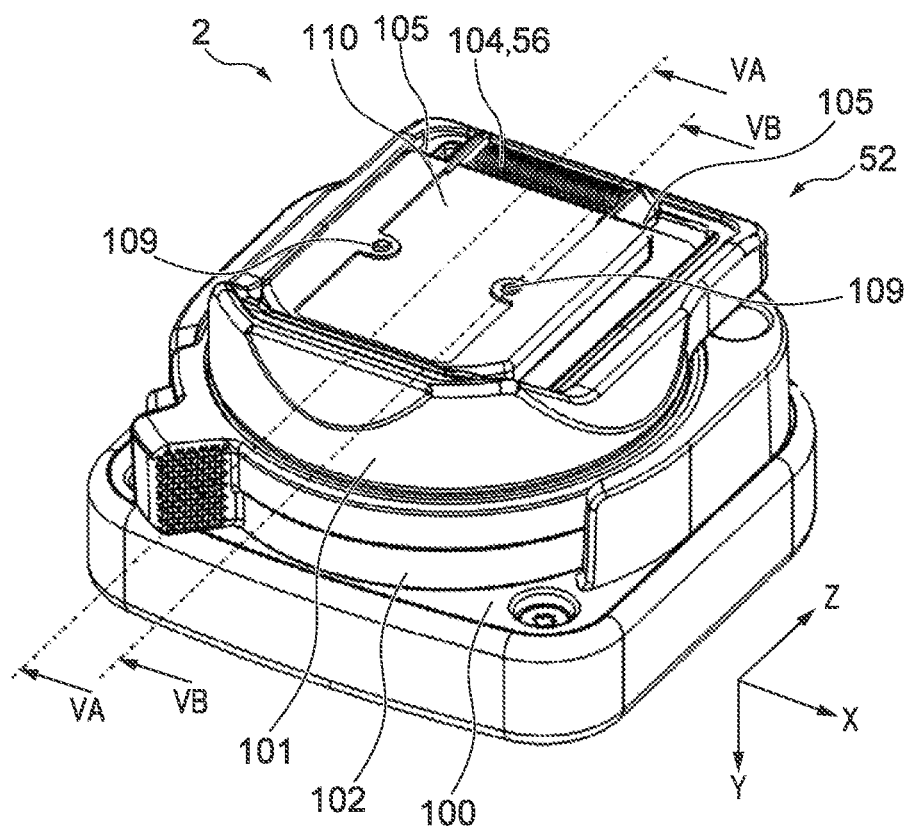
FIG. 4 is an external perspective view of the external recording device in FIG. 3 as seen from the lower surface on which an external engagement unit is located.

FIG. 4 is an external perspective view of the external recording device 2 in FIG. 3 as seen from its lower surface on which the external engagement unit 52 is located.

Figure 5A:
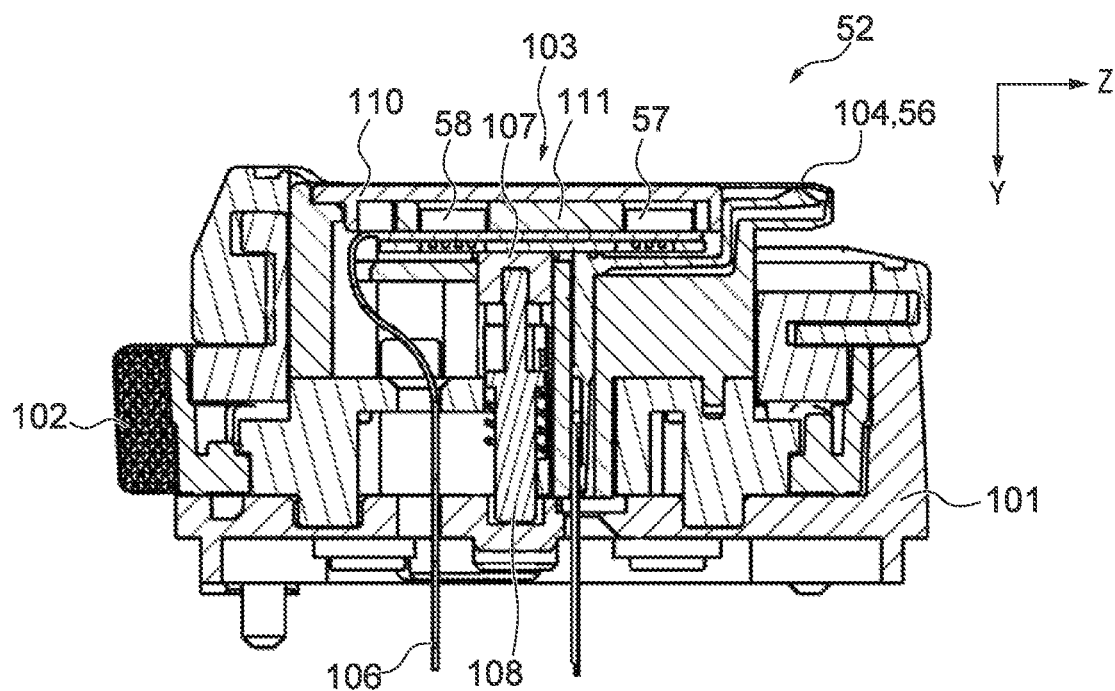
FIGS. 5A and 5B are cross-sectional views of an engaged area of the external recording device in FIG. 4.
Figure 5B:
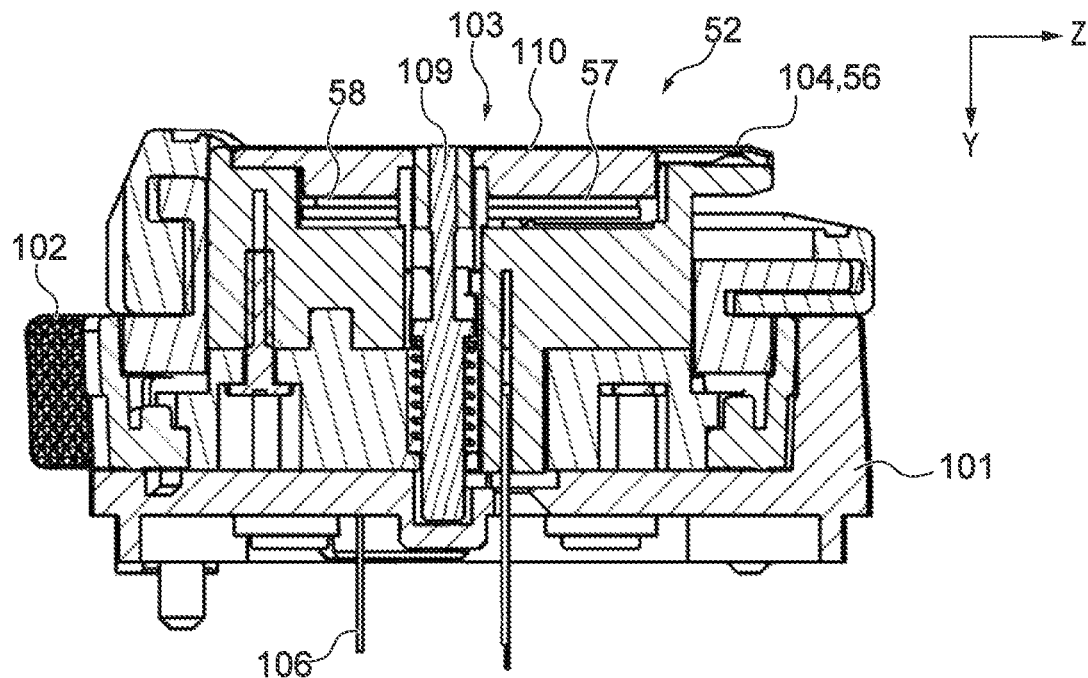

FIGS. 5A and 5B are cross-sectional views of an engaged area of the external recording device 2 in FIG. 4.

FIG. 5A is a cross-sectional view taken along line VA-VA in FIG. 4. FIG. 5B is a cross-sectional view taken along line VB-VB in FIG. 4.

FIGS. 6A and 6B are exploded perspective views of the external recording device 2 in FIG. 4. FIG. 6A is an exploded perspective view of the external recording device 2 in the orientation illustrated in FIG. 4. FIG. 6B is an exploded perspective view of the external recording device 2 that is turned upside down in the Y-axis direction from its orientation in FIG. 6A.

Figure 7:
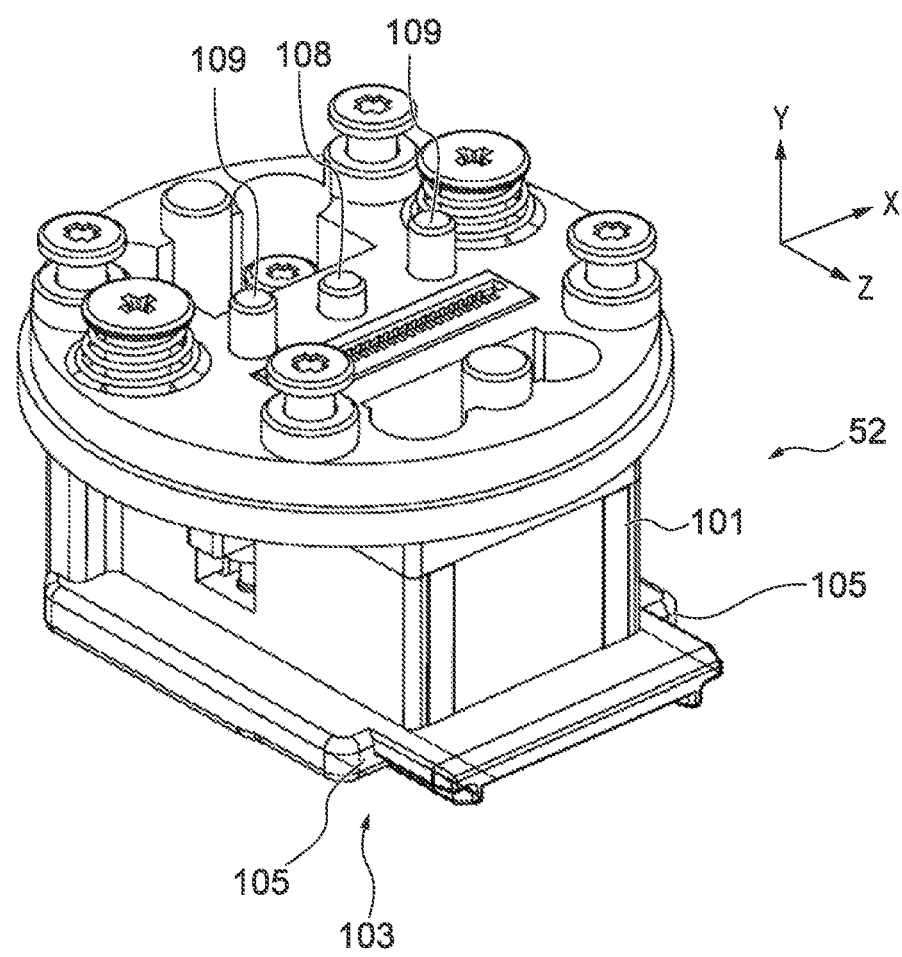
FIG. 7 is a perspective view of a part of components in FIG. 6B being joined together.

FIG. 7 is a perspective view of a part of the components of the external recording device 2 in FIG. 6B being joined together.

As illustrated in FIG. 4 to FIG. 7, the external recording device 2 has an external body 100, which is substantially cubic and on which the recording medium 55 is removably mounted, and an enclosure 101 that projects downward from the bottom of the external body 100 in the Y-axis direction. The enclosure 101 is made of a nonconductive material (dielectric material) like a synthetic resin material and has a substantially cylindrical shape that is one size or slightly smaller than an outside shape of the external body 100.

A lock lever 102, which is an operation member, is provided on an outer periphery of the substantially cylindrical enclosure 101 so as to be rotatable in a circumferential direction.

The external engagement unit 52 is provided in a projecting manner in an outer edge portion of a lower surface of the enclosure 101 in the Y-axis direction. The external engagement unit 52 projects outwardly from a lower edge portion of the outer periphery of the enclosure 101 such that an outside shape of the external engagement unit 52 has a substantially rectangular flat shape. The external engagement unit 52 is a part of the external recording device 2 which can be slidably mounted into the apparatus engagement unit 12 of the digital camera 1.

A recess 103 is formed on the lower surface of the enclosure 101. An external cover member 110 that has a substantially flat shape is provided in the recess 103 so as to be movable upward and downward along the Y-axis direction. On the upper surface of the substantially flat external cover member 110 in the Y-axis direction, the external receiver module 58 and the external transmitter module 57 are located at a distance while being kept apart from each other by an external radio wave absorption member 111. The external receiver module 58 and the external transmitter module 57 are covered with the substantially flat external cover member 110 in the recess 103 inside the external engagement unit 52 and movable upward and downward together with the external cover member 110 along the Y-axis direction. The external receiver module 58 and the external transmitter module 57 are connected to the external recording MPU 51 in FIG. 3 by a flexible printed board 106 running inside the enclosure 101.

On the lower surface of the enclosure 101, the external connection terminal 56 given by the external flat connector 104, on which the plurality of electrode terminals is flatly arrayed, is located in an area adjacent to the recess 103 in the Z-axis direction. The external receiver module 58, the external transmitter module 57, and the external connection terminal 56 are arranged tightly and closely to one another in the external engagement unit 52 of the external recording device 2. The external connection terminal 56 is connectable to the external flat connector 104, which can be shared by other existing accessory devices for the digital camera 1. The external receiver module 58 and the external transmitter module 57 are a plurality of external wireless communicators of the external recording device 2. It should be noted that as distinct from FIG. 4 to FIG. 7, a plurality of pin electrode members shared by other existing accessory devices for the digital camera 1 may be additionally provided on the lower surface of the enclosure 101. In this case, the external receiver module 58 and the external transmitter module 57 may be placed at such locations in the external engagement unit 52 of the external recording device 2 that they do not overlap the external connection terminal 56 or the plurality of pin electrode members.

As illustrated in FIG. 7, the external engagement unit 52 forms abutment surfaces 105 on both sides of the external connection terminal 56 in the X-axis direction. The abutment surfaces 105 abut against the apparatus engagement unit 12 when the external recording device 2 is mounted on the digital camera 1. The abutment fixes the position at which the external recording device 2 is mounted on the digital camera 1. The external recording device 2 is stably mounted on the digital camera 1 at a fixed position not only in the X-axis direction and the Y-axis direction but also in the Z-axis direction.

In the recess 103 on the lower surface of the enclosure 101, a substantially flat pin connection member 107 is located on the upper surface of the flexible printed board 106. The enclosure 101 is provided with a sliding pin 108 extending along the Y-axis direction. The sliding pin 108 is movable in the Y-axis direction and capable of downwardly pushing the pin connection member 107 located in the recess 103. The enclosure 101 is also provided with a pair of lock pins 109 extending along the Y-axis direction. The pair of lock pins 109 is movable in the Y-axis direction and capable of projecting in the Y-axis direction from the lower surface of the enclosure 101.

When the lock lower 102 is turned in one direction, an action of a cam, which is not illustrated, causes the pair of lock pins 109 and the sliding pin 108 to move along the Y-axis direction toward the lower surface of the enclosure 101. The pair of lock pins 109 projects from the lower surface of the enclosure 101. The sliding pin 108 as well as the pin connection member 107 pushes the external cover member 110 downward in the Y-axis direction. This causes the external cover member 110 to move down from a retracted position, at which it fits in the recess 103 on the lower surface of the enclosure 101, to reach a position flush with the lower surface of the enclosure 101.

When the lock lower 102 is turned in the opposite direction, the pair of lock pins 109 and the sliding pin 108 move along the Y-axis direction toward the upper surface of the enclosure 101. The pair of lock pins 109 fits in the enclosure 101 such that it does not project from the lower surface of the enclosure 101. The pin connection member 107, which has stopped being pushed downward by the sliding pin 108, moves up along the Y-axis direction. The external cover member 110 moves up along the Y-axis direction such that it does not become flush with the lower surface of the enclosure 101 and reaches the retracted position, at Which it fits in the recess 103 on the lower surface of the enclosure 101.

Figure 8A:
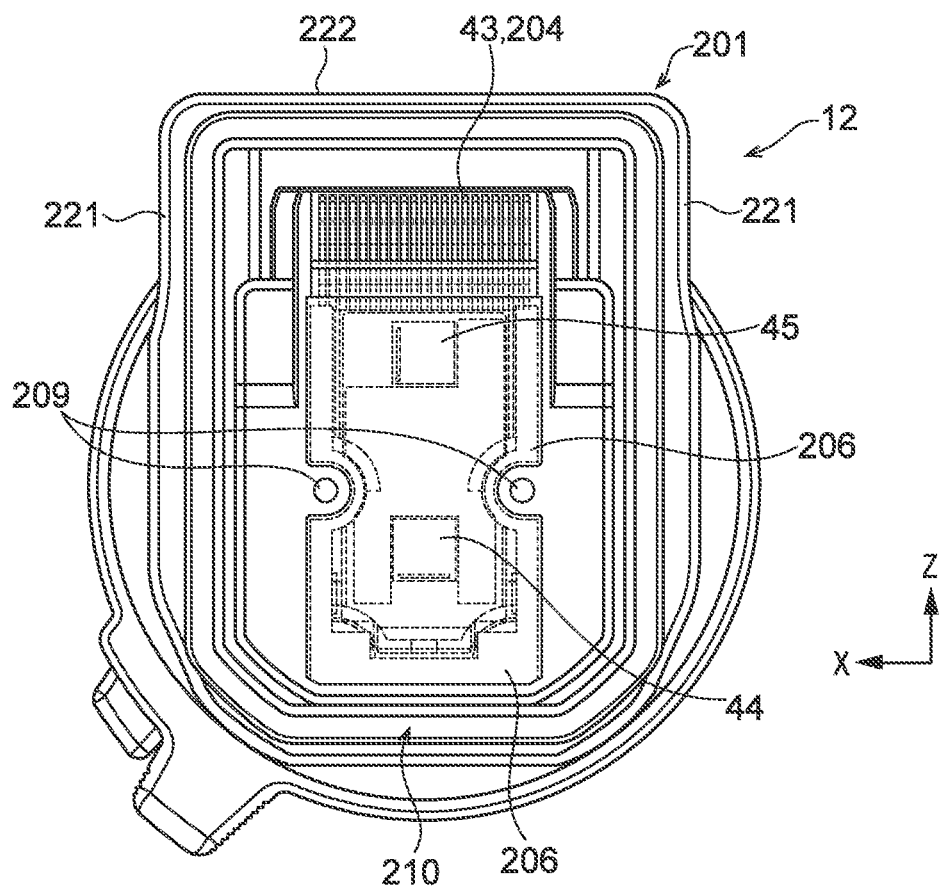
FIGS. 8A and 8B are views useful in explaining an apparatus engagement unit of the digital camera in FIG. 2.
Figure 8B:
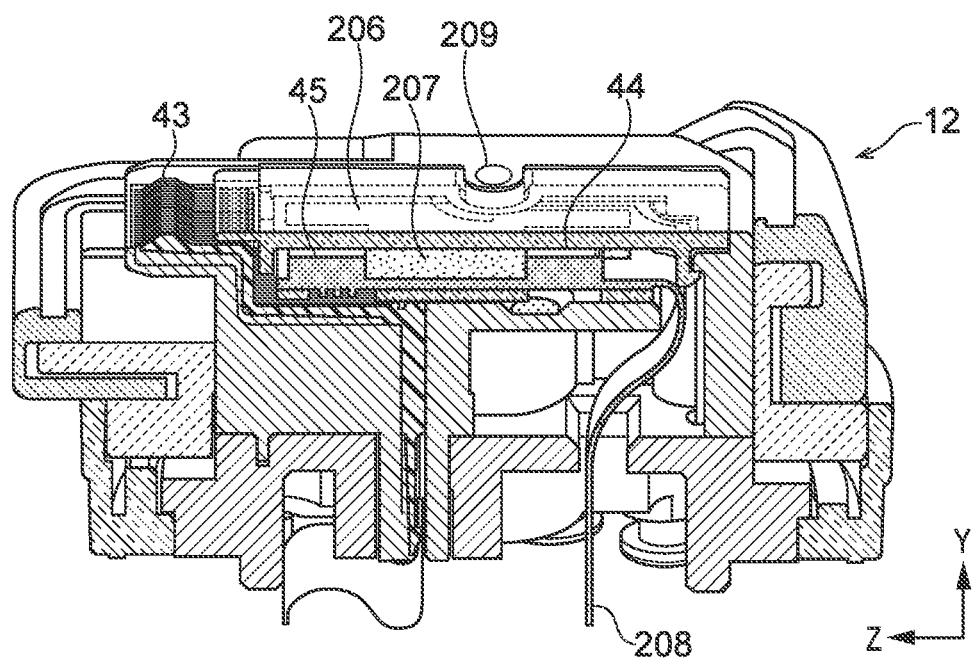

FIGS. 8A and 8B are views useful in explaining the apparatus engagement unit 12 of the digital camera 1 in FIG. 2. FIG. 8A is a perspective view illustrating an external appearance of the apparatus engagement unit 12 as seen from above in the Y-axis direction. FIG. 8B is a cross-sectional view of the apparatus engagement unit 12 in FIG. 8A.

Figure 9:
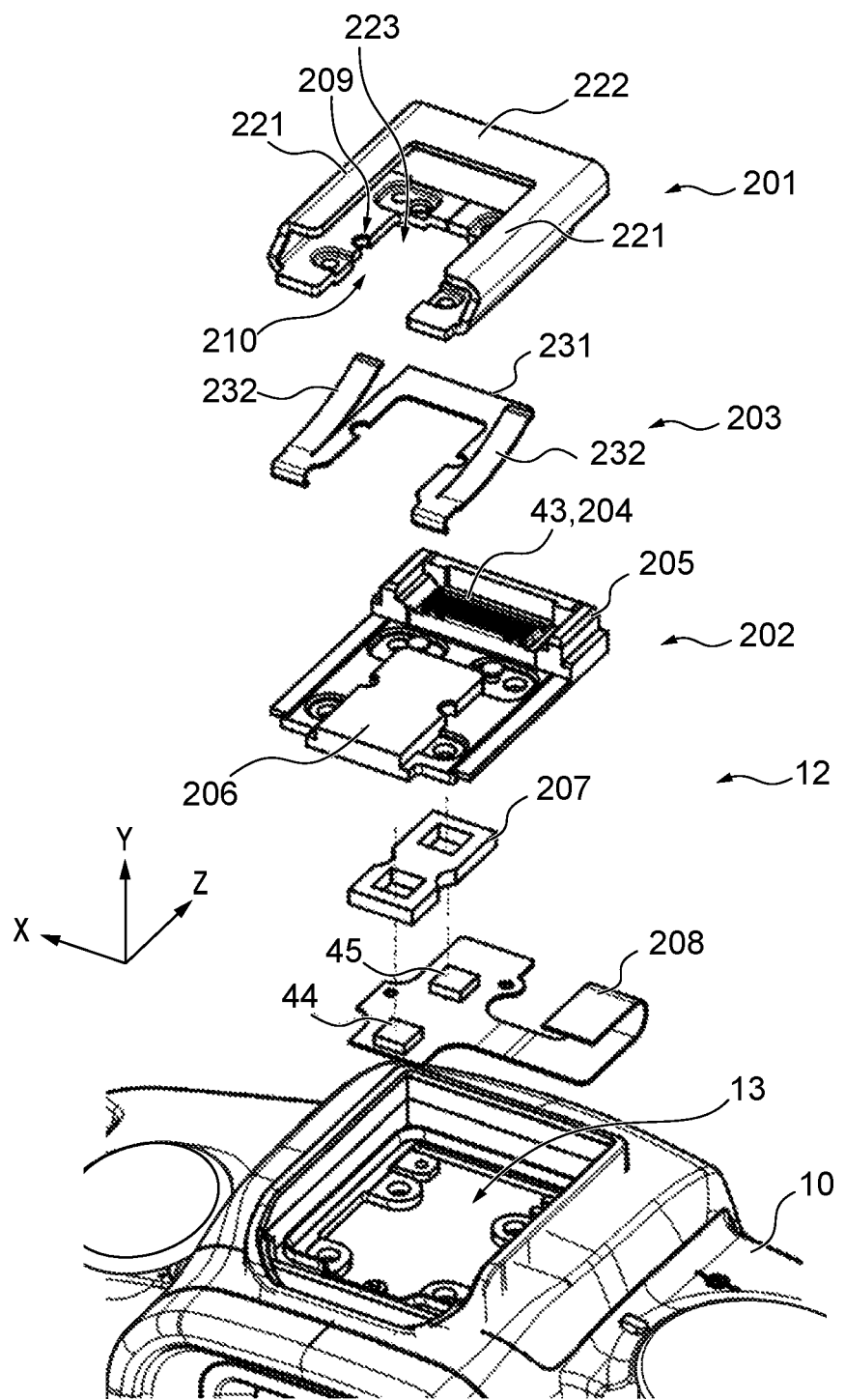
FIG. 9 is an exploded perspective view of the apparatus engagement unit of the digital camera in FIGS. 8A and 8B.

FIG. 9 is an exploded perspective view of the apparatus engagement unit 12 of the digital camera 1 in FIGS. 8A and 8B.

Figure 10A:
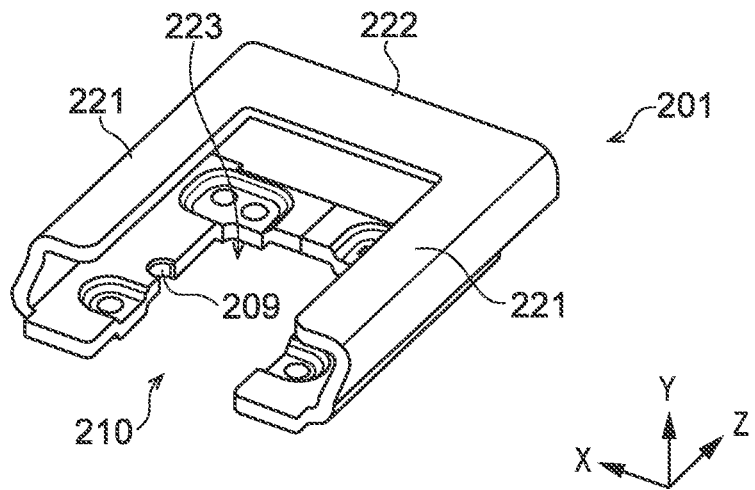
FIGS. 10A to 10C are views useful in explaining main mounting components of the apparatus engagement unit in FIG. 9.
Figure 10B:
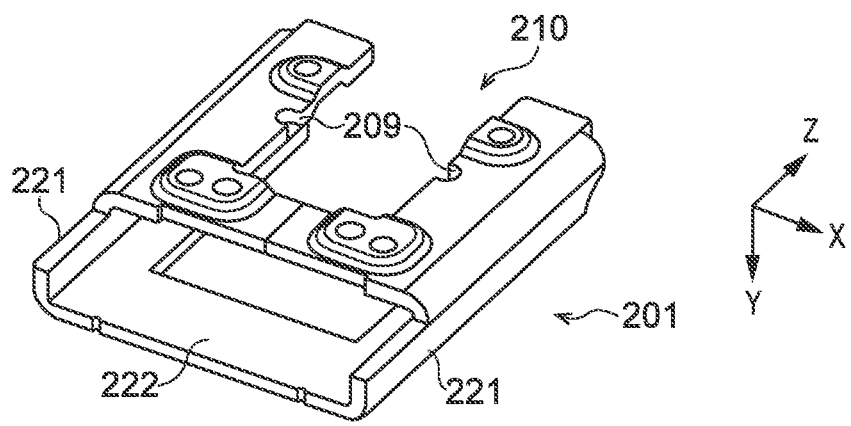
Figure 10C:
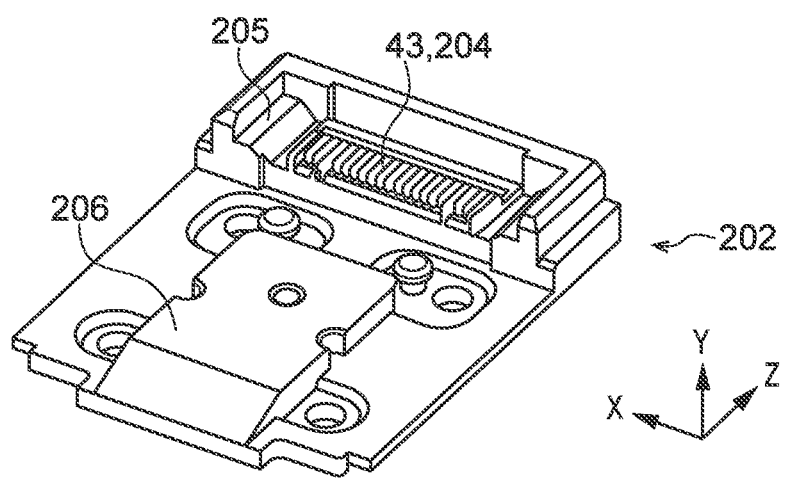

FIGS. 10A to 10C are views useful in explaining main mounting components of the apparatus engagement unit 12 in FIG. 9. FIG. 10A is a perspective view illustrating a metallic shoe plate 201 as seen from diagonally above. FIG. 10BA is a perspective view illustrating a rear surface of the metallic shoe plate 201. FIG. 10C is a perspective view illustrating a terminal member 202 as seen from diagonally above.

As illustrated in FIGS. 8A to 10C, the apparatus engagement unit 12 of the digital camera 1 includes the metallic shoe plate 201, the terminal member 202, and a shoe spring 203. The terminal member 202 is provided with the apparatus connection terminal 43, the apparatus transmitter module 44 and the apparatus receiver module 45.

The apparatus engagement unit 12 is located in a mounting recess 13, which is formed in an upper part of the camera body 10, in a such a way as to be exposed.

The terminal member 202 is a board having substantially rectangular flat shape.

An apparatus flat connector 204 on which a plurality of electrode terminals is flatly arrayed is located in one end portion of the substantially rectangular flat terminal member 202 in the Z-axis direction. The apparatus flat connector 204 corresponds to the apparatus connection terminal 43 and formed over one side of the substantially rectangular flat terminal member 202. A periphery of the apparatus flat connector 204 is surrounded by a rib 205 extending along outer edges of the terminal member 202. The abutment surfaces 105 of the external recording device 2 slidably mounted into the apparatus engagement unit 12 abut against the rib 205.

A substantially flat apparatus cover member 206 is formed in the other end portion of the substantially rectangular flat terminal member 202 in the Z-axis direction. The apparatus cover member 206 projects from the upper surface of the substantially rectangular flat terminal member 202 upward in the Y-axis direction. The apparatus cover member 206 can be in sliding contact with the external recording device 2 when the external engagement unit 52 of the external recording device 2 is slidably mounted into the apparatus engagement unit 12.

On the lower surface of the apparatus cover member 206 in the Y-axis direction, the apparatus receiver module 45 and the apparatus transmitter module 44 are located at a distance while kept apart from each other by an apparatus radio wave absorption member 207. The apparatus receiver module 45 and the apparatus transmitter module 44 are covered with the substantially flat apparatus cover member 206. The apparatus receiver module 45 and the apparatus transmitter module 44 are expected to have a static preventive effect. The apparatus receiver module 45 and the apparatus transmitter module 44 are connected to the external device controller 33 in FIG. 2 by a flexible printed board 208.

In the substantially rectangular flat terminal member 202, a pair of lock recesses 209 into which the pair of lock pins 109 is insertable is formed on both sides of the substantially flat apparatus cover member 206 in the X-axis direction.

The metallic shoe plate 201, which is made of a metallic plate formed in a flat tube shape, includes a pair of engagement portions 221 and a connection portion 222 which connects the pair of engagement portions 221 together. The terminal member 202 is inserted into the flat tube-shaped metallic shoe plate 201, The pair of engagement portions 221 is located on the right and left sides of the substantially flat apparatus cover member 206 in the X-axis direction and extends along the Z-axis direction. In other words, the pair of engagement portions 221 is located so as to sandwich the external engagement unit 52 of the external recording device 2 from the right and left sides. The connection portion 222 overlies the apparatus flat connector 204 in the Y-axis direction. As a result, an engagement recess 223 is formed between the pair of engagement portions 221 and the connection portion 222. The pair of engagement portions 221 and the connection portion 222 form a substantially rectangular U-shape that surrounds three sides of the engagement recess 223. The substantially flat apparatus cover member 206 exposes itself from the engagement recess 223. The apparatus flat connector 204 is hidden by the connection portion 222.

In the apparatus engagement unit 12 configured as described above, the pair of engagement portions 221 and the connection portion 222 (metallic shoe plate 201) is engageable with the external engagement unit 52 of the external recording device 2, which is slidably mounted into the apparatus engagement unit 12, while surrounding the external engagement unit 52 in three directions other than a sliding direction in which the external engagement unit 52 slides. The external engagement unit 52 of the external recording device 2 can be slid (or slidably mounted) into the flat tube-shaped metallic shoe plate 201 through a slide opening 210 which is formed on the side of the flat tube-shaped metallic shoe plate 201 on which the engagement recess 223 is formed (or on which the pair of engagement portions 221 are not connected by the connection portion 222).

The shoe spring 203 has a structure in which a base material 231 is bent on both of its right and left sides to form spring portions 232. With the spring portions 232 being compressed toward the base material 231, the shoe spring 203 is inserted between the metallic shoe plate 201 and the terminal member 202 inserted in the metallic shoe plate 201. The external engagement unit 52 of the external recording device 2 slid between the metallic shoe plate 201 and the terminal member 202 can be pressed against the metallic shoe plate 201 by the shoe spring 203.

Figure 11A:
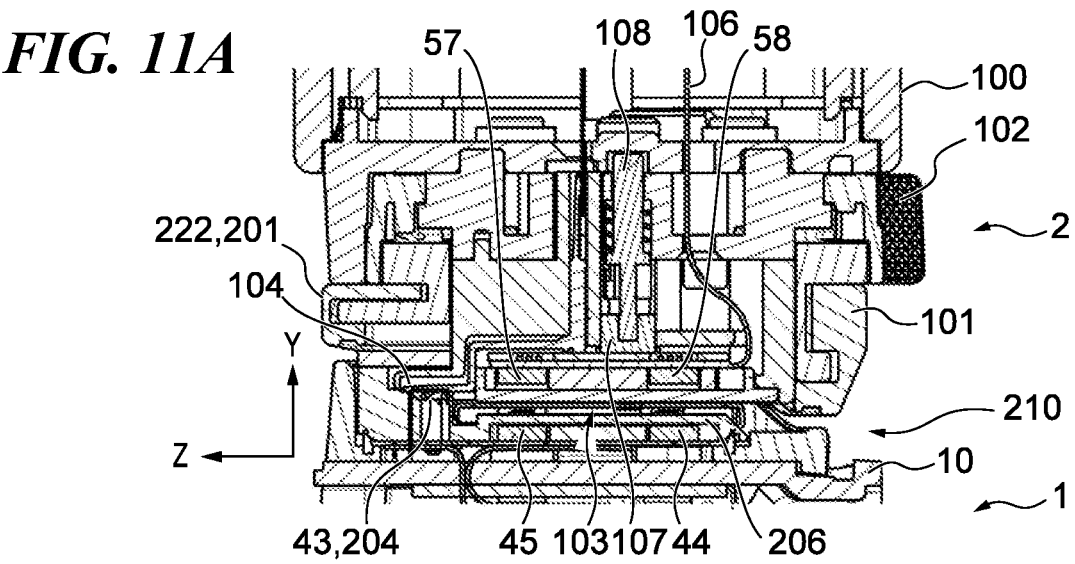
FIGS. 11A to 11C are views useful in explaining the external recording device in FIG. 3 being slidably mounted onto the digital camera in FIGS. 8A and 8B.
Figure 11B:
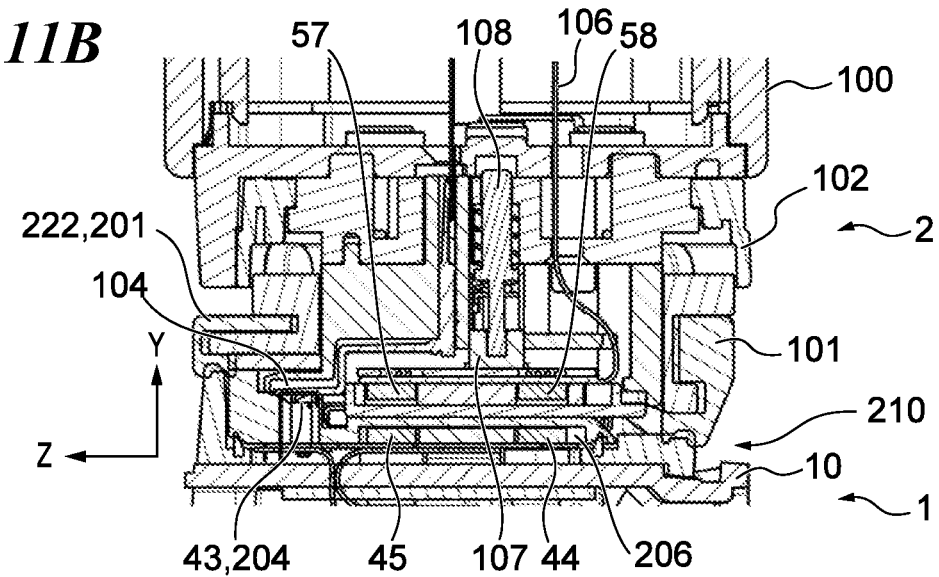
Figure 11C:
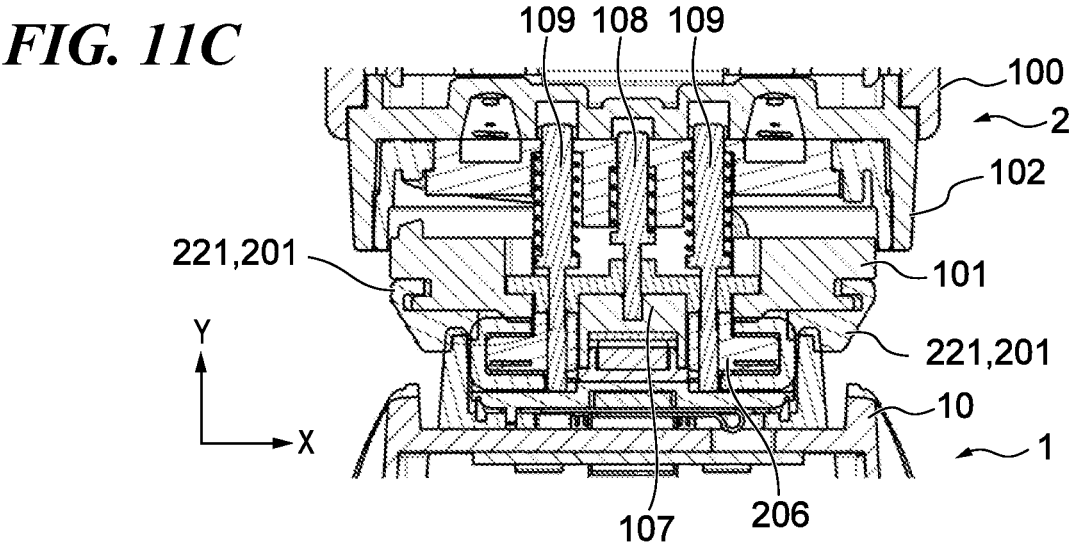

FIGS. 11A to 11C are views useful in explaining the external recording device 2 in FIG. 3 being slidably mounted onto the digital camera 1 in FIGS. 8A and 8B. FIG. 11A is a cross-sectional view illustrating an insertion state in which the external engagement unit 52 of the external recording device 2 has been slidably inserted into the metallic shoe plate 201 of the apparatus engagement unit 12 in the digital camera 1. FIG. 11A is a cross-sectional view taken in the Z-axis direction that is the slidably inserting direction. FIG. 11B is a cross-sectional view illustrating a fixed state in which the lock lever 102 has been turned in one direction in the insertion state in FIG. 11A. FIG. 11B is a cross-sectional view taken in the Z-axis direction that is the slidably inserting direction as with FIG. 11A. FIG. 11C is a cross-sectional view illustrating how the pair of lock pins 109 and the pair of lock recesses 209 are fitted together in the fixed state in FIG. 11B. FIG. 11C is a cross-sectional view taken in the X-axis direction.

In the external recording device 2, its external engagement unit 52 is slidably inserted into the metallic shoe plate 201 (specifically, into between the pair of engagement portions 221 toward the connection portion 222) of the apparatus engagement unit 12 in the digital camera 1 through the slide opening 210 which is formed on a side of the metallic shoe plate 201 where the pair of engagement portions 221 are not connected by the connection portion 222. The external engagement unit 52 of the external recording device 2, which is sandwiched between the pair of engagement portions 221 of the flat tube-shaped metallic shoe plate 201, is slid and inserted into the metallic shoe plate 201 along the Z-axis direction while crushing the shoe spring 203 in the Y-axis direction. The abutment surfaces 105 abutting against the rib 205 causes the external engagement unit 52 of the external recording device 2 to be positioned in the Z-axis direction as illustrated in FIG. 11A. In this state, the external engagement unit 52 of the external recording device 2 is surrounded by the pair of engagement portions 221 and the connection portion 222 of the metallic shoe plate 201 in the three directions other than the sliding direction and engaged with the metallic shoe plate 201. The external flat connector 104 of the external recording device 2 comes into contact with and electrically connects to the apparatus flat connector 204 of the digital camera 1.

When the lock lever 102 of the external recording device 2 is turned in one direction, the pair of lock pins 109 and the sliding pin 108 move downward along the Y-axis direction. As illustrated in FIG. 11C, the pair of lock pins 109 is projected from the lower surface of the enclosure 101 and inserted into the pair of lock recesses 209 in the apparatus engagement unit 12 of the digital camera 1. As a result, even when the external recording device 2 is operated to be slid in the Z-axis direction toward the slide opening 210, the external recording device 2 never become detached from the apparatus engagement unit 12 of the digital camera 1.

Moreover, when the lock lever 102 of the external recording device 2 is turned in one direction, the sliding pin 108 pushes the pin connection member 107 and the external cover member 110 downward in the Y-axis direction in response to the turning operation. The external recording device 2 moves up and down in a direction in which it comes into contact with and separates from the apparatus cover member 206, lowers from the retracted position away from the digital camera 1, and comes into close contact with the apparatus cover member 206 as illustrated in FIGS. 11B and 11C. The external receiver module 58 on the top of the external cover member 110 moves down to get close to the apparatus transmitter module 44 under the apparatus cover member 206. The external transmitter module 57 on the top of the external cover member 110 moves down to get close to the apparatus receiver module 45 under the apparatus cover member 206.

By getting close to each other, the external receiver module 58 and the apparatus transmitter module 44, which face each other, can form a wireless communication path on which wireless communication using high frequency waves is possible. By getting close to each other, the external transmitter module 57 and the apparatus receiver module 45, which face each other, can form a wireless communication path on which wireless communication using high frequency waves is possible. Using these wireless communication paths on which wireless communication using high frequency waves is possible, the camera MPU 31 of the digital camera 1 and the external recording MPU 51 of the external recording device 2 can send and receive a large amount of data at high speed. The camera MPU 31 of the digital camera 1 and the external recording MPU 51 of the external recording device 2 can also send and receive data using a wired communication path formed by the apparatus flat connector 204 of the digital camera 1 and the external flat connector 104 of the external recording device 2.

Figure 12A:
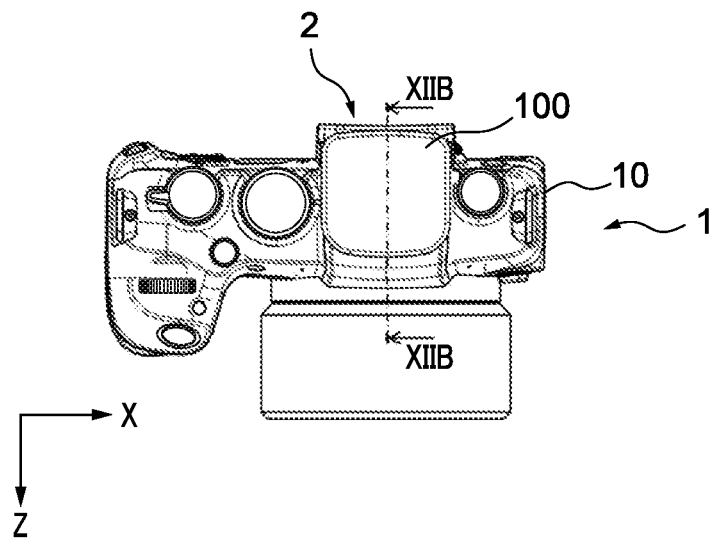
FIGS. 12A and 12B are views useful in explaining a state in which the external recording device in FIG. 3 has been slidably mounted onto the digital camera in FIGS. 8A and 8B, and they are ready for communication.
Figure 12B:
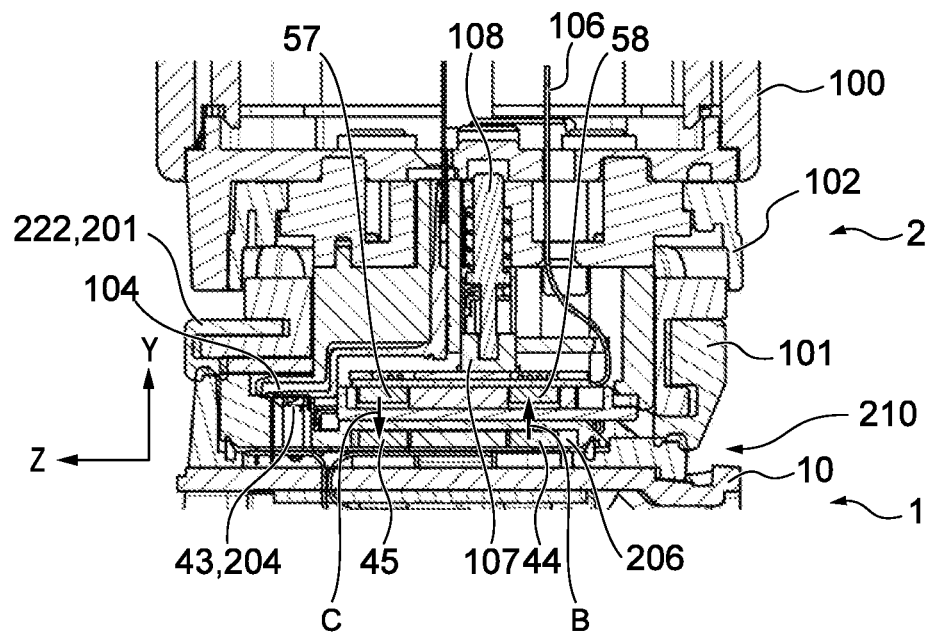

FIGS. 12A and 12B are views useful in explaining a state in which the external recording device 2 in FIG. 3 has been slidably mounted onto the digital camera 1 in FIGS. 8A and 8B, and they are ready for communication. FIG. 12A is a view of the digital camera 1 on which the external recording device 2 has been mounted as seen from above in the Y-axis direction. FIG. 12B is a cross-sectional view of an area where the external recording device 2 and the digital camera 1 has been engaged together in the mounted state in FIG. 12A, taken along line XIIB-XIIB.

As illustrated in FIG. 12B, the apparatus transmitter module 44 and the apparatus receiver module 45 of the digital camera 1 are arrayed at a distance from each other in the Z-axis direction. The apparatus transmitter module 44 is placed closer to the slide opening 210 than the apparatus receiver module 45. The external transmitter module 57 and the external receiver module 58 of the external recording device 2 are arrayed at a distance from each other in the Z-axis direction. The external receiver module 58 is placed closer to the slide opening 210 than the external transmitter module 57.

In such a state in which the external recording device 2 has been slidably mounted onto the digital camera 1, the apparatus transmitter module 44 of the digital camera 1 outputs a radio wave as indicated by the arrow B in FIG. 12B. The radio wave output from the apparatus transmitter module 44 is received by the external receiver module 58 of the external recording device 2 close to the apparatus transmitter module 44 and faces the apparatus transmitter module 44.

The external transmitter module 57 of the external recording device 2 outputs a radio wave as indicated by the arrow C in FIG. 12B. The radio wave Output from the external transmitter module 57 is received by the apparatus receiver module 45 of the digital camera 1 which is close to the external transmitter module 57 and faces the external transmitter module 57.

Figure 13A:
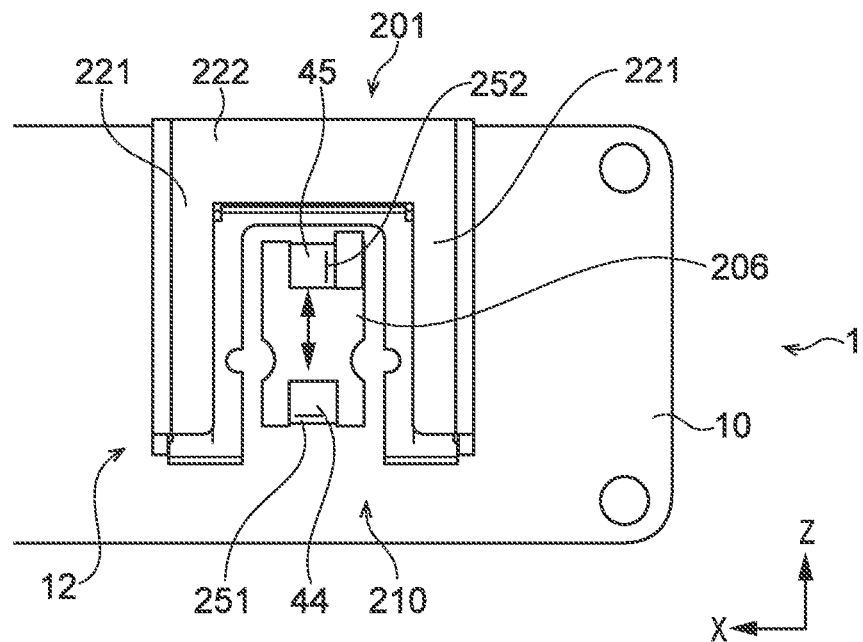
FIGS. 13A and 13B are views useful in explaining radiation characteristics of a plurality of apparatus wireless communication modules located in the engaged area of the digital camera in FIGS. 8A and 8B.
Figure 13B:
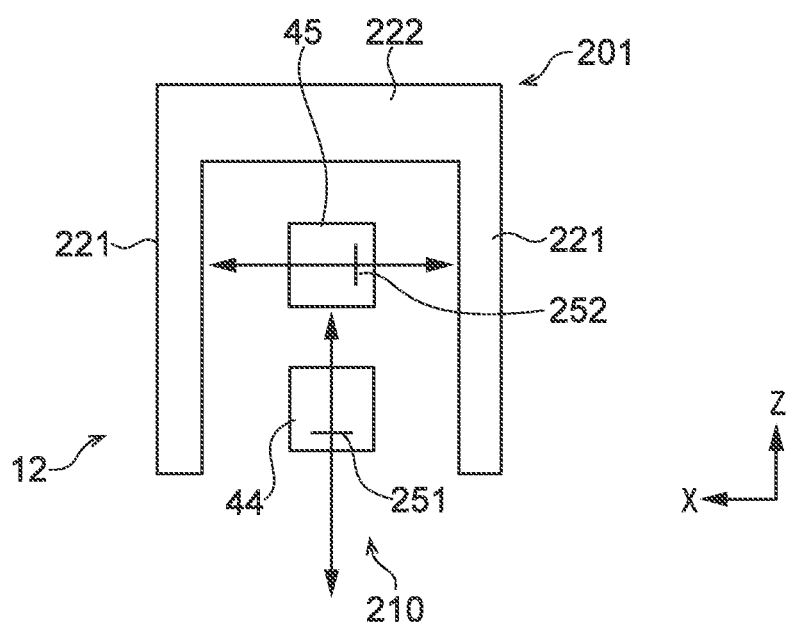

FIGS. 13A and 13B are views useful in explaining radiation characteristics of a plurality of apparatus wireless communication modules located in the engaged area of the digital camera 1 in FIGS. 8A and 8B.

The apparatus transmitter module 44 located closest to the slide opening 210 in the digital camera 1 has an antenna 251 for wireless communication (contactless communication) which extends in the X-axis direction as illustrated in FIG. 13A. In this case, a radio wave output from the apparatus transmitter module 44 has such a radiation characteristic that it is output at higher intensity in the Z-axis direction than in the X-axis direction as illustrated in FIG. 13B. It should be noted here that directions in radiation characteristics of wireless communicators are the direction of the maximum radiation in the directivities of antennas given by the respective wireless communicators. FIG. 13B indicates the direction of the maximum radiation in the directivity of the antenna 251 by using a both arrow. The apparatus transmitter module 44 functions as a first apparatus wireless communication module that is located closest to the slide opening 210 and has a radiation characteristic directed toward the slide opening 210.

The apparatus receiver module 45 located farther from the slide opening 210 than the apparatus transmitter module 44 in the digital camera 1 has an antenna 252 extending in the Z-axis direction as illustrated in FIG. 13A. A radio wave output from the apparatus receiver module 45 has such a radiation characteristic that it is output at higher intensity in the X-axis direction than in the Z-axis direction. The intensity at which the radio wave is received is the same as the radiation characteristic. FIG. 13B indicates the direction of the maximum radiation in the directivity of the antenna 252 by using a both arrow. The apparatus receiver module 45 functions as a second apparatus wireless communication module that is located the second closest to the slide opening 210 after the first apparatus wireless communication module and has a radiation characteristic directed perpendicularly to that of the first apparatus wireless communication module.

Thus, the apparatus wireless communication modules are arranged in the apparatus engagement unit 12 such that the direction of their radiation characteristics differ from each other by 90 degrees, and the radiation characteristics of all of the apparatus wireless communicators are at least not parallel to each another. The apparatus transmitter module 44 and the apparatus receiver module 45 are located at a distance from each other in the sliding direction in which the external engagement unit 52 slides, and arranged in this order form the slide opening 210 side.

Figure 14:
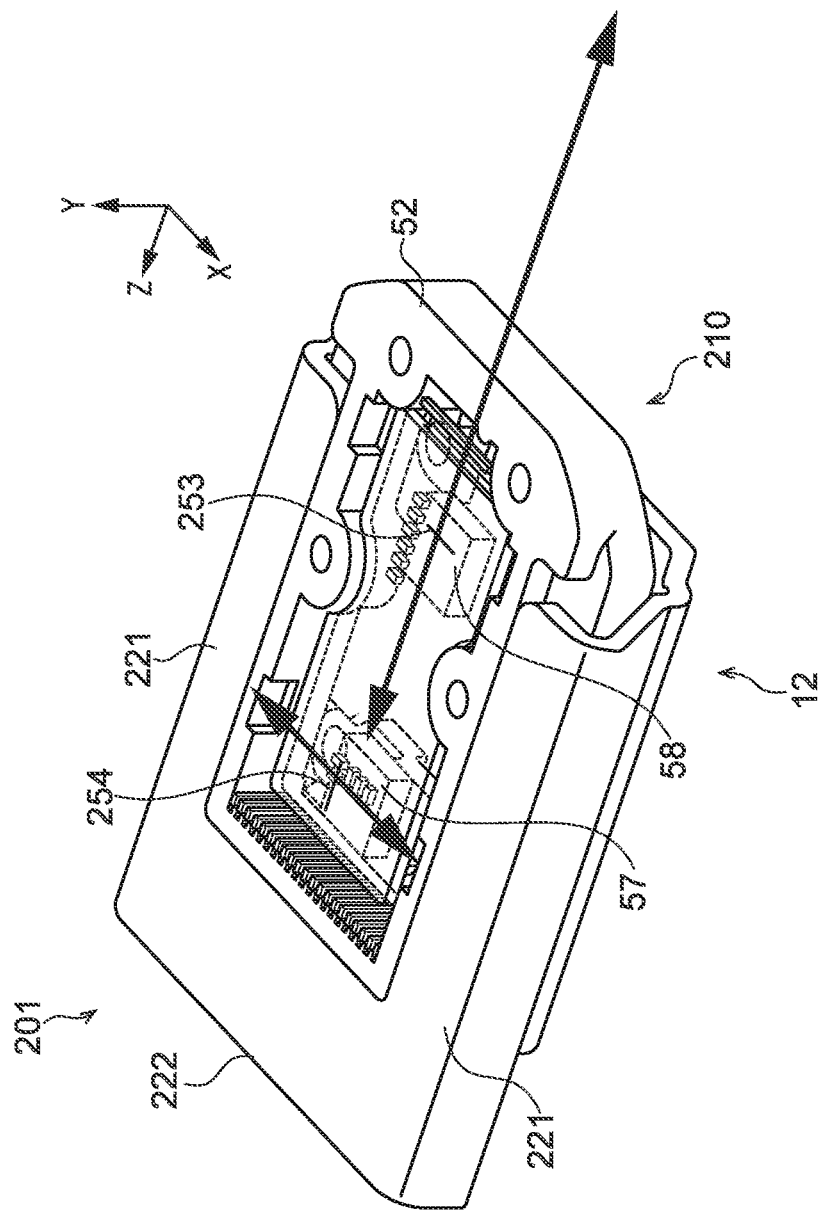
FIG. 14 is a view useful in explaining radiation characteristics of a plurality of external wireless communication modules provided in the engaged area of the external recording device in FIG. 3.

FIG. 14 is a view useful in explaining radiation characteristics of a plurality of external wireless communication modules located in the engaged area of the external recording device 2 in FIG. 3.

The external receiver module 58 located closest to the slide opening 210 in the digital camera 1 has an antenna 253 extending in the X-axis direction. A radio wave output from the external receiver module 58 has such a radiation characteristic that it is output at higher intensity in the Z-axis direction than in the X-axis direction as illustrated in FIG. 14. The intensity at which the radio wave is received is the same as the radiation characteristic. FIG. 14 indicates the direction of the maximum radiation in the directivity of the antenna 253 by using a both arrow. The external receiver module 58 functions as a first external wireless communication module that is located closest to the slide opening 210 and has a radiation characteristic directed in a direction opposite to the direction in which the external engagement unit 52 is slid into the slid opening 210 (or is slidably mounted onto the external recording device 2).

The external transmitter module 57 located farther from the slide opening 210 in the digital camera 1 than the external receiver module 58 has an antenna 254 extending in the Z-axis direction. A radio wave output from the external transmitter module 57 has such a radiation characteristic that it is output at higher intensity in the X-axis direction than in the Z-axis direction as illustrated in FIG. 14. FIG. 14 indicates the direction of the maximum radiation in the directivity of the antenna 254 by using a both arrow. The external transmitter module 57 functions as a second external wireless communication module that is located the second closest to the slide opening 210 after the external receiver module 58 and has a radiation characteristic directed perpendicularly to that of the first apparatus wireless communication module.

Thus, the external wireless communication modules are arranged in the external engagement unit 52 such that the direction of their radiation characteristics differ from each other by 90 degrees, and the radiation characteristics of all of the external wireless communication modules are at least not parallel to each another. The external transmitter module 57 and the external receiver module 58 are arranged in this order form the slide opening 210 side and at a distance from each other in the direction in which the external engagement unit 52 slides.

It should be noted that each of the external transmitter module 57, the external receiver module 58, the apparatus transmitter module 44, and the apparatus receiver module 45 may have a member other than the antennas 251 to 254, for example, a wireless communication circuit. Functions of the wireless communication circuit may be implemented integratedly in the external device controller 33 or the external recording MPU 51.

Each of the plurality of wireless communication modules described above may have an antenna that carries out wireless communications with other antennas through electromagnetic fields such as electromagnetic induction and magnetic resonance, not an antenna with dipole characteristics.

As is clear from comparison with FIGS. 12A and 12B, the distance between the apparatus transmitter module 44 and the apparatus receiver module 45 facing each other is shorter than the distances of these wireless communication modules from the metallic shoe plate 201.

The distance between the apparatus receiver module 45 and the external transmitter module 57 facing each other is shorter than the distances of these wireless communication modules from the metallic shoe plate 201. An antenna of a wireless communication modules has a predetermined radiation characteristic, and a direction in which a radio wave is strongly emitted depends on the radiation characteristic. In wireless communication, when there is a metallic member in the direction of the radiation characteristic, the radio wave strike and is reflected by the metallic member. The reflected radio wave has a variety of effects on characteristics of the antenna.

As illustrated in FIGS. 13A, 13B, and 14, the metallic shoe plate 201 surrounds the antennas 251 to 254 of all the wireless communication modules on an X-Z plane. The metallic shoe plates 201 surrounds all the wireless communication modules in three directions.

Accordingly, in the present embodiment, a set of multiple wireless communication modules i.e. the pair of the apparatus transmitter module 44 and the external receiver module 58 located closest to the slide opening 210 has a radiation characteristic directed in the Z-axis direction. Thus, a radio wave sent and received by the pair of wireless communication modules located closest to the slide opening 210 is likely to be output from the slide opening 210 to the outside of the engaged area. Moreover, the distance to the connection portion 222 of the metallic shoe plate 201 present in the Z direction is long. Even if the radio wave is reflected by the connection portion 222 of the metallic shoe plate 201, the intensity of the radio wave moving back and forth over the long distance weakens. The effect of the radio wave reflected by the connection portion 222 of the metallic shoe plate 201 can be minimized. A pair of wireless communication modules located closest to the slide opening 210 is not likely to be affected by the metallic shoe plate 201 surrounding them. Auto interference is not likely to occur.

A set of multiple wireless communication modules i.e. the pair of the apparatus receiver module 45 and the external transmitter module 57 located the second closest to the slide opening 210 has an X-directional radiation characteristic perpendicular to the Z-axis direction. Thus, they are not likely to be affected by radio waves sent and received by a plurality of wireless communication modules located closest to the slide opening 210. Mutual interference is not likely to occur.

On the other hand, if the radiation characteristic of the apparatus receiver module 45 and the external transmitter module 57 is the Z-axis direction, which is parallel to that of the apparatus transmitter module 44 and the external receiver module 58, their radio waves interfere each other while remaining strong.

As described above, in the present embodiment, the plurality of apparatus wireless communication modules is tightly arranged in the apparatus engagement unit 12 and capable of communicating with the plurality of external wireless communication modules in the external engagement unit 52 of the external recording device 2.

The digital camera 1 is capable of implementing high-speed data communication with the external recording device 2 via proximate wireless communication using a plurality of wireless communication paths formed by a plurality of apparatus wireless communication modules.

Moreover, the apparatus wireless communication modules of the digital camera 1 and the external communication modules of the external recording device 2 are housed in the engaged area of the digital camera 1 and the external recording device 2. For this reason, the distance from the apparatus wireless communication modules to the external communication modules can be shortened as compared to a case where they are provided outside the engaged area. The apparatus wireless communication modules and the external communication modules can implement power-saving and efficient wireless communication by preventing output increase in wireless communication even if the frequency of radio waves is increased so as to send and received a large amount of data at high speed.

Furthermore, the plurality of apparatus wireless communication modules tightly located in the apparatus engagement unit 12 is arranged such that all of their radiation characteristics are at least not parallel to each other.

As a result, in the present embodiment, radio waves sent and received by, for example, one apparatus wireless communication module are not likely to be received by the other apparatus wireless communication module located close to the one apparatus wireless communication module.

Unlike the present embodiment, for example, there is the possibility that the plurality of apparatus wireless communication modules tightly located in the apparatus engagement unit 12 is arranged such that all of their radiation characteristics are parallel to each other. In this case, radio waves sent and received by, for example, one apparatus wireless communication module are likely to be received by the other apparatus wireless communication module located close to the one apparatus wireless communication module. Mutual interference is likely to occur between the plurality of apparatus wireless communication modules, which is tightly arranged in a limited area i.e. the apparatus engagement unit 12. Occurrence of this situation can be prevented in the present embodiment.

As described above, in the present embodiment, the external recording device 2 can be mounted on the digital camera 1 so as to send and receive a large amount of data at high speed.

Moreover, a part of radio waves sent and received to and from the external communication module by the apparatus wireless communication module may be reflected by or propagate through the metallic shoe plate 201 provided around them.

To cope with it, in the present embodiment, the wireless communication modules are located such that the distance between the apparatus wireless communication modules and the external communication modules is shorter than the distance between at least the apparatus wireless communication modules (or the external wireless communication modules) and the metallic shoe plate 201.

In the present embodiment, the reception intensity of radio waves propagating directly between the wireless communication modules facing each other can be relatively higher than that of radio waves propagating through the metallic shoe plate 201.

In the present embodiment, effects of radio waves reflected by and propagating through the metallic shoe plate 201 can be reduced to prevent a decrease in the communication speed of wireless communication between the wireless communication modules facing each other.

Moreover, in the present embodiment, when the apparatus engagement unit 12, the first apparatus wireless communication module, and the second apparatus wireless communication module are projected onto a plane facing the external recording device 2, the distance from the first apparatus wireless communication module to the apparatus engagement unit 12 in the direction of the radiation characteristic is longer than the distance from the second apparatus wireless communication module to the apparatus engagement unit 12 in the direction of the radiation characteristic in the plane. As for radio waves sent and received to and from the external communication module by the first apparatus wireless communication module, it is expected that the radio waves are radiated outside as they are without being reflected by the metallic shoe plate 201 on the slide opening 210 side, and also, the reflected waves on the opposite side to the slide opening 210 are attenuated significantly because the distance from the first apparatus wireless communication module to the metallic shoe plate 201 is long.

It is possible to reduce effects of radio waves sent and received by the first apparatus wireless communication module on wireless communication between the second apparatus wireless communication module located at the rear on the opposite side of the slide opening 210 and the external wireless communication module of the external engagement unit 52 which faces the second apparatus wireless communication module.

Moreover, in the present embodiment, the plurality of external wireless communication modules of the external recording device 2 is located in the external engagement unit 52 of the external recording device 2 so as to be movable upward and downward in the direction in which the external engagement unit 52 comes into contact with and separated from the digital camera 1 onto which the external engagement unit 52 is slidably mounted. Therefore, when the external engagement unit 52 of the external recording device 2 is slidably mounted into the apparatus engagement unit 12, the apparatus engagement unit 12 does not strongly abut against the plurality of external wireless communication modules located in the external engagement unit 52.

Unlike the present embodiment, there is a possibility that, for example, the plurality of external wireless communication modules located in the external engagement unit 52 will be placed fixedly at a location close to the plurality of apparatus wireless communication modules located in the apparatus engagement unit 12. In this case, when the external engagement unit 52 of the external recording device 2 is slidably mounted into the external engagement unit 52, the apparatus engagement unit 12 may strongly abut against and get snagged on the plurality of external wireless communication modules provided in the external engagement unit 52. The external wireless communication modules may be broken due to strong force.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Although in the embodiment described above, it is assumed that the external recording device 2 is mounted on the digital camera 1 (image pickup apparatus), the digital camera 1 can be another electronic apparatus, and the external recording device 2 can be another external device that is configured to be mounted on this electronic apparatus.

In the embodiment described above, the apparatus transmitter module 44 and the external receiver module 58 are placed at the location closest to the slide opening 210.

Alternatively, for example, the apparatus receiver module 45 and the external transmitter module 57 may be placed at a location closest to the slide opening 210. In this case, the apparatus transmitter module 44 and the external receiver module 58 are placed at a location that is the second closest to the slide opening 210. In this case, the same effects as those in the embodiment described above can be achieved as well.

There may be three or more pairs of such wireless communication modules.

In the embodiment described above, when the external engagement unit 52 is to be slidably mounted onto the digital camera 1, the external transmitter module 57 and the external receiver module 58 of the external recording device 2 lie at the retracted position away from the digital camera 1, and when the external engagement unit 52 has been slidably mounted onto the digital camera 1, the external transmitter module 57 and the external receiver module 58 of the external recording device 2 move down from the retracted position to become close to the digital camera 1 in response to an operation like turning of the lock lever 102 that is an operation member provided in the external recording device 2, in this case, the operation member may be provided in the digital camera 1, not in the external recording device 2.

Additionally, in response to an operation that causes the external engagement unit 52 of the external recording device 2 to be slidably mounted onto the digital camera 1, the external transmitter module 57 and the external receiver module 58 may move down from the retracted position away from the digital camera 1 to become close to the digital camera 1.

Also, in response to an operation that restricts a position at which of the external engagement unit 52 of the external recording device 2 is mounted on the digital camera 1, the external transmitter module 57 and the external receiver module 58 may move down from the retracted position away from the digital camera 1 to become close to the digital camera 1.

Moreover, in response to any of the above-described operations, not the external transmitter module 57 and the external receiver module 58 of the external recording device 2 but the apparatus transmitter module 44 and the apparatus receiver module 45 of the digital camera 1 may move up from the retracted position away from the external recording device 2 to become close to the external recording device 2.

In this case, the operation member may be provided, for example, in the digital camera 1, not in the external recording device 2.

This application claims the benefit of Japanese Patent Application No. 2021-022569 filed on Feb. 16, 2021 which is hereby incorporated by reference herein in its entirety.

What is claimed is:

1. An electronic apparatus capable of communicating with an external device mounted thereon, the electronic apparatus comprising:
   an apparatus engagement unit into which an external engagement unit of the external device is to be mounted; and
   a plurality of apparatus wireless communicators located in the apparatus engagement unit so as to face a plurality of external wireless communicators located in the external engagement unit mounted into the apparatus engagement unit, respectively,
   wherein antennas given by the respective apparatus wireless communicators are arranged in the apparatus engagement unit such that radiation characteristics of all of the antennas are at least not parallel.

2. The electronic apparatus according to claim 1, wherein the apparatus engagement unit comprises a metallic shoe plate that is engageable with the external engagement unit slidably mounted into the apparatus engagement unit, while surrounding the external engagement unit in three directions other than a sliding direction in which the external engagement unit slides, and
   a distance between the apparatus wireless communicators and the external wireless communicators facing each other in a state in which the external engagement unit has been slidably mounted into the apparatus engagement unit is shorter than at least a distance between the apparatus wireless communicators and the metallic shoe plate.

3. The electronic apparatus according to claim 2, wherein the metallic shoe plate comprises a pair of engagement portions located so as to sandwich the external engagement unit of the external device from right and left sides, and a connection portion that connects the pair of engagement portions together,
   the pair of engagement portions and the connection portion are engageable with the external engagement unit of the external device while surrounding the external engagement unit in the three directions other than the sliding direction so that the external engagement unit can be slidably mounted into between the pair of engagement portions toward the connection portion through a slide opening which is formed on a side of the metallic shoe plate where the pair of engagement portions are not connected by the connection portion,
   the plurality of apparatus wireless communicators includes a first apparatus wireless communicator and a second apparatus wireless communicator which are located at a distance from each other in the sliding direction of the external engagement unit and are arranged in the metallic shoe plate in this order from a side of the slide opening,
   the first apparatus wireless communicator located closest to the slide opening has a radiation characteristic toward the slide opening, and
   the second wireless communicator located second closest to the slide opening after the first apparatus wireless communicator has a radiation characteristic perpendicular to the radiation characteristic of the first apparatus wireless communicator.

4. The electronic apparatus according to claim 1, further comprising a cover member that is in sliding contact with the external device when the external engagement unit of the external device is slidably mounted into the apparatus engagement unit,
   wherein the plurality of apparatus wireless communicators is covered with the cover member.

5. The electronic apparatus according to claim 1, wherein directions in radiation characteristics of the apparatus wireless communicators are the directions of the maximum radiation in the directivities of antennas given by the respective apparatus wireless communicators.

6. The electronic apparatus according to claim 1, wherein the electronic apparatus is an image pickup apparatus.

7. An external device capable of communicating with an electronic apparatus while being mounted on the electronic apparatus, the external device comprising:
   an external engagement unit capable of being slidably mounted into an apparatus engagement unit of the electronic apparatus; and
   a plurality of external wireless communicators located in the external engagement unit so as to face a plurality of apparatus wireless communicators located in the apparatus engagement unit of the electronic apparatus, respectively,
   wherein antennas given by the respective apparatus wireless communicators are arranged in the external engagement unit such that radiation characteristics of all of the antennas are at least not parallel.

8. The external device according to claim 7, wherein the external engagement unit is engageable with a metallic shoe plate of the apparatus engagement unit, while being surrounded by the metallic shoe plate in three directions other than a direction in which the external device slidably mounted onto the electronic apparatus slides, and
   a distance between the external wireless communicators and the apparatus wireless communicators facing each other in a state in which the external engagement unit has been slidably mounted into the apparatus engagement unit is shorter than at least a distance between the external wireless communicators and the metallic shoe plate of the electronic apparatus in the state in which the external engagement unit of the external device has been slidably mounted into the apparatus engagement unit.

9. The external device according to claim 8, wherein the plurality of external wireless communicators includes a first external wireless communicator and a second external wireless communicator which are located at a distance from each other in a direction in which the external engagement unit slidably mounted into the apparatus engagement unit slides and are arranged in this order from a side of a slide opening of the metallic shoe plate of the electronic apparatus, the first external wireless communicator located closest to the slide opening has a radiation characteristic toward the slide opening; and the second external wireless communicator located second closest to the slide opening after the first external wireless communicator has a radiation characteristic perpendicular to the radiation characteristic of the first external wireless communicator.

10. The external device according to claim 7, wherein the plurality of external wireless communicators located in the external engagement unit is movable upward and downward in a direction in which the plurality of external wireless communicators comes into contact with and is separated from the electronic apparatus onto which the external engagement unit is slidably mounted.

11. The external device according to claim 10, wherein
the plurality of external wireless communicators being movable upward and downward,
lies at a retracted position away from the electronic apparatus when the external engagement unit is to be slidably mounted onto the electronic apparatus, and
in a state in which the external engagement unit has been slidably mounted onto the electronic apparatus, moves down to become close to the electronic apparatus.

12. The external device according to claim 10, wherein
the plurality of external wireless communicators being movable upward and downward, moves down from a retracted position away from the electronic apparatus to become close to the electronic apparatus in response to
an operation that causes the external engagement unit of the external device to be slidably mounted onto the electronic apparatus,
an operation that restricts a position at which the external engagement unit is mounted on the electronic apparatus, or
an operation of an operation member that is provided in the external device or the electronic apparatus.

13. The external device according to claim 7, wherein the external device comprises a storage device that stores data for the electronic apparatus.

* * * * *